(12) United States Patent
Yukawa et al.

(10) Patent No.: US 6,219,468 B1
(45) Date of Patent: *Apr. 17, 2001

(54) IMAGE DETECTION SYSTEM

(75) Inventors: Kazuhiko Yukawa, Sakai; Masataka Hamada, Osakasayama; Keiji Tamai, Suita, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,415

(22) Filed: Oct. 17, 1997

(30) Foreign Application Priority Data

| Oct. 17, 1996 | (JP) | 8-275009 |
| Oct. 17, 1996 | (JP) | 8-275019 |
| Oct. 17, 1996 | (JP) | 8-275023 |
| Oct. 17, 1996 | (JP) | 8-275027 |
| Oct. 17, 1996 | (JP) | 8-275034 |
| Oct. 17, 1996 | (JP) | 8-275042 |
| Oct. 17, 1996 | (JP) | 8-275048 |

(51) Int. Cl.$^7$ .................. G06K 9/22; H04N 3/14
(52) U.S. Cl. ............................. 382/312; 348/311
(58) Field of Search ................... 358/461, 443, 358/446, 519, 483; 348/275, 319, 242, 253, 297, 303, 675, 311; 396/123; 250/201.2; 382/312, 313, 314, 315, 316, 317, 318, 319, 321, 322, 323, 324

(56) References Cited

U.S. PATENT DOCUMENTS

| 4,672,453 | * | 6/1987 | Sakamoto | 358/294 |
| 4,833,532 | * | 5/1989 | Abe | 358/80 |
| 4,835,615 |  | 5/1989 | Taniguchi et al. | 358/213.19 |
| 4,887,252 | * | 12/1989 | Miyakawa et al. | 358/48 |
| 4,910,548 | * | 3/1990 | Taniguchi et al. | 354/407 |
| 4,972,254 | * | 11/1990 | Endo et al. | 358/44 |
| 4,985,774 |  | 1/1991 | Ishida et al. | 358/213.19 |
| 5,218,442 |  | 6/1993 | Hamada et al. | 358/222 |
| 5,597,999 |  | 1/1997 | Kinba et al. | 250/201.7 |

* cited by examiner

Primary Examiner—Jose L. Couso
Assistant Examiner—Duy M. Dang
(74) Attorney, Agent, or Firm—McDermott, Will & Emery

(57) ABSTRACT

In an image detection system having within one-chip IC an area sensor, an area sensor driver for driving the area sensor and an area sensor output processing circuit for processing an output of the area sensor, the charges accumulated in necessary pixel areas of the area sensor are transferred at a transfer clock of a speed at which A/D conversion may be performed by an A/D converter incorporated in a microcomputer and are read out in image blur detection, and the charges accumulated in unnecessary pixel areas are transferred at a high-speed transfer clock and dumped.

24 Claims, 20 Drawing Sheets

VERTICAL
NON-ADDITION
MODE

VERTICAL
ADDITION
MODE

HORIZONTAL
NON-ADDITION
MODE

HORIZONTAL
ADDITION
MODE

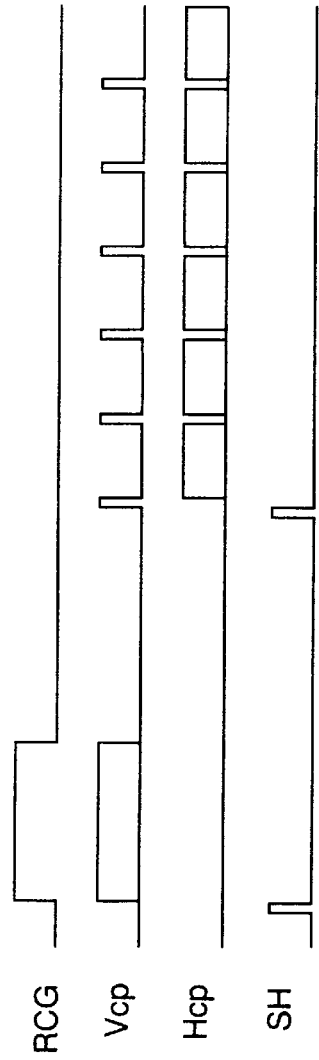
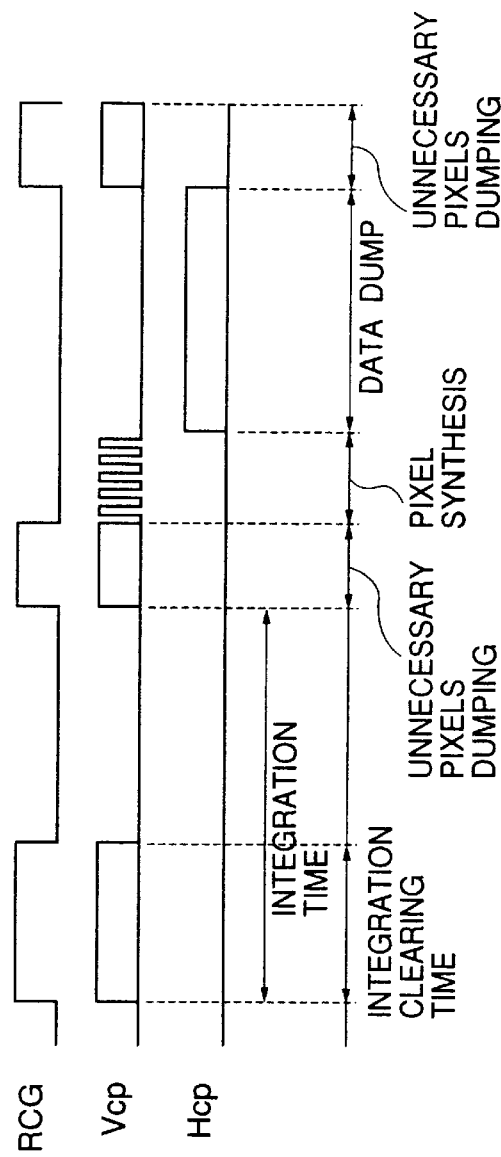
FIG. 16A AREA SENSOR MODE
FIG. 16B LINE SENSOR MODE

IMAGE DETECTION SYSTEM

BACKGROUND OF THE INVENTION

1. Field of the Invention

The present invention relates to an image detection system provided with a plurality of area sensors for use, for example, in various types of cameras, binoculars, and optical measurement instruments.

2. Description of the Prior Art

It is a well-known technique to use an image detection system provided with a pair of image sensors in order to detect the distance of a measurement object or detect the focus condition of an objective optical system. This technique is used to achieve automatic focusing, that is, to bring an objective optical system into an in-focus condition automatically in accordance with the result of distance or focus detection. In the following descriptions, such distance detection or focus detection will be referred to as automatic focusing.

An image detection system having a pair of image sensors achieves automatic focusing in the following manner. The light from an object is split into two light beams by means of a separator lens, and the two light beams are individually projected onto the pair of image sensors. Then, on the basis of the two images formed on the two image sensors, the distance of the object, or the amount of an image blur caused by a camera shake (hereafter referred simply as an "image blur"), is calculated. Accordingly, it is necessary to read out signals from both image sensors within a single integration operation.

This can be realized, of course, by providing each image sensor with a separate driving circuit and a separate signal processing circuit. However, in consideration of cost reduction, some conventional image detection systems are provided with only one driving circuit and one signal processing circuit and are designed to achieve, nevertheless, automatic focusing by reading out signals from two image sensors in a single integration operation.

This type of image detection system has as its pair of image sensors a pair of line sensors. In the image detection system, only the electric charges appearing in the sensor that is being read at a particular moment are transferred to shift registers for output, whereas the electric charges appearing in the other sensors are held in an accumulation area provided between the pixels and the shift registers. When reading of one sensor is complete, the next sensor is read by transferring the electric charges held in the accumulation area for that sensor to the shift registers for output.

However, this conventional construction is based on line sensors, and therefore, if it is applied to image detection systems based on area sensors, like those embodying the present invention, the resulting systems will suffer from the following disadvantages. First, providing electric charge accumulation areas in area sensors result in reduced aperture ratios of the area sensors. Second, an image detection system based on line sensors is not ready for image blur detection, and therefore it is not provided with any means for reading a signal from only one of a given pair of sensors, which means that it is not possible to use a single image detection system both for automatic focusing and for image blur detection.

SUMMARY OF THE INVENTION

An object of the present invention is to provide an image detection system that allows a plurality of area sensors used both for automatic focusing and for image blur detection to be driven by a single driving circuit without sacrificing the aperture ratio of the area sensors.

To achieve the above object, according to one aspect of the present invention, an image detection system is provided with a number n of area sensors; a driving circuit for driving the area sensors; an output circuit for outputting signals from the area sensors in synchronism with a transfer clock having a predetermined frequency and supplied to each of the area sensors; a signal processing circuit for processing the signals outputted from the output circuit; and a control circuit for performing switching at a frequency n times the frequency of the transfer clock in order to select a signal to be outputted from among those signals from the area sensors which are outputted in synchronism with the transfer clock.

According to another aspect of the present invention, a method for processing output signals from a number n of area sensors consists of a transferring step for outputting signals from the area sensors in synchronism with a transfer clock having a predetermined frequency and supplied to each of the area sensors; and an output control step for performing switching at a frequency n times the frequency of the transfer clock in order to select a signal to be outputted from among those signals from the area sensors which are outputted in synchronism with the transfer clock.

BRIEF DESCRIPTION OF THE DRAWINGS

This and other objects and features of this invention will become clear from the following description, taken in conjunction with the preferred embodiments with reference to the accompanied drawings in which:

FIG. 16A is a timing chart of a normal area sensor mode;

FIG. 16B is a timing chart of a line sensor mode for automatic focusing;

DESCRIPTION OF THE PREFERRED EMBODIMENTS

Figure 1:
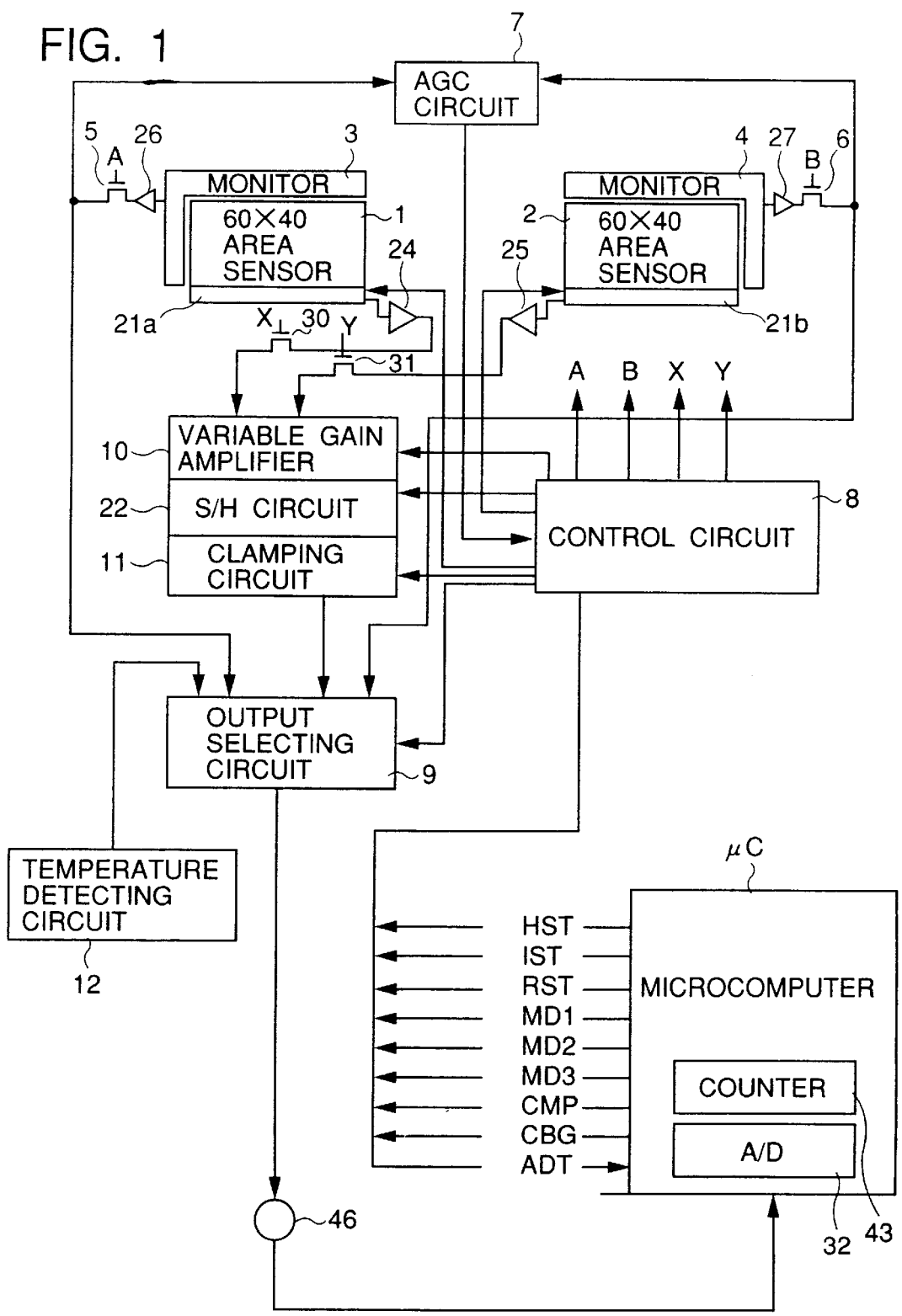
FIG. 1 shows the device construction of an image detection system having two area sensors and a control circuit for controlling the sensors.

FIG. 1 shows the device construction of an image detection system for a camera having two area sensors 1 and 2 and a control circuit 8 for controlling the sensors 1 and 2. The outputs of the area sensors 1 and 2 are used for automatic focusing (AF) and image blur detection as described later. The area sensors 1 and 2 and subsequently-described monitors 3 and 4 comprise photoelectric conversion elements.

This device comprises as main elements the area sensors 1 and 2 having horizontal transfer registers 21a and 21b, L-shaped monitors 3 and 4 disposed along the two sides of the area sensors 1 and 2, an automatic gain control (AGC) circuit 7, the control circuit 8, a variable gain amplifier 10, a sample and hold (S/H) circuit 22, a clamping circuit 11, an output selecting circuit 9, a temperature detecting circuit 12 and a microcomputer μC, and is provided with output buffers and output switches of these elements.

Specifically, this device is provided with output buffers 26 and 27 and output switches 5 and 6 of the monitors 3 and 4, and output buffers 24 and 25 and output switches 30 and 31 of the horizontal transfer registers 21a and 21b. In this device, the control circuit 8 constitutes an area sensor driver, and the variable gain amplifier 10, the S/H circuit 22, the clamping circuit 11 and the output selecting circuit 9 constitute an area sensor output processing circuit. The monitors 3 and 4 monitor the charges accumulated in the corresponding area sensors 1 and 2. The horizontal transfer registers 21a and 21b temporarily hold the charges in the area sensors 1 and 2 and output them in series.

The clamping circuit 11 is activated to clamp the voltage corresponding to a dark current to a predetermined voltage at a timing at which the charge of a black reference pixel (OB) is outputted from the area sensors 1 and 2. The output selecting circuit 9 which is common to all the outputs selects, by order of the control circuit 8, from among the outputs of the area sensors 1 and 2, the outputs of the monitors 3 and 4 and the output of the temperature detecting circuit 12, and outputs the selected output.

This device is formed as a one-chip integrated circuit (IC) in which the elements other than the microcomputer μC are disposed on a single chip. Hereinafter, devices formed on the chip will be referred to as internally-formed devices and devices not formed on the chip will be referred to as externally-formed devices. The monitor signals outputted from the monitors 3 and 4 are selectively supplied to the AGC circuit 7 and the output selecting circuit 9 through the output buffers 26 and 27 and the output switches 5 and 6.

The switches 5 and 6 comprise metal oxide semiconductor (MOS) transistors and are turned on when switching signals A and B generated from the control circuit 8 are applied to the gate electrodes thereof at low level. A monitor signal to be supplied to the AGC circuit 7 and the output selecting circuit 9 is selected based on which switch is turned on. That is, one of the monitor signals of the monitors 3 and 4 is selected by the switching signal A or B. The selection of the monitor signal will be described later.

Integration is simultaneously started at the area sensors 1 and 2 and the monitors 3 and 4. When integration is started, the AGC circuit 7 monitors that the inputted monitor signal reaches a predetermined voltage and when the predetermined voltage is reached, the AGC circuit 7 informs the control circuit 8 that the monitor signal has reached the predetermined voltage. Informed of that, the control circuit 8 terminates the integration of the area sensors 1 and 2 and informs the external microcomputer μC that the integration has terminated (hereinafter, this termination of integration will be referred to as "natural termination"). The AGC circuit 7 may comprise a comparator with the predetermined voltage as a reference voltage and with the monitor signal as a comparison voltage.

When the monitor signal does not reach the predetermined voltage before a predetermined time has elapsed, i.e. when the external microcomputer μC is not informed by the control circuit 8 that the predetermined voltage has been reached, the microcomputer μC instructs the control circuit 8 to forcefully terminate the integration of the area sensors 1 and 2, so that a forceful termination is performed.

In either of the natural termination and the forceful termination of integration, when integration is terminated, the monitor signal supplied from the output selecting circuit 9 to the external microcomputer μC through a Vout terminal 46 is analog-to-digital (A/D) converted by an A/D converter 32 incorporated in the microcomputer μC at a timing of the termination of integration, and in accordance with the digital value, the factor of amplification applied to the outputs of the area sensors is decided. The amplification factor is transmitted to the control circuit 8 to set the amplification factor in the variable gain amplifier 10. When integration is naturally terminated, the amplification factor is one. In the case of the natural termination, the amplification factor may be set at one without the monitor signal being A/D converted to decide the amplification factor.

After the termination of integration, the outputs of the area sensors 1 and 2 are transferred to the horizontal transfer registers 21a and 21b and inputted to the variable gain amplifier 10 through the output buffers 24 and 25 and the switches 30 and 31 to be amplified at the amplification factor set previously. The switches 30 and 31 have a similar construction to the switches 5 and 6. The control circuit 8 generates switching signals X and Y to select the output of the area sensor 1 or 2 supplied to the variable gain amplifier 10.

The frequency of the switching signals X and Y is set at twice the frequency of the transfer clock so that it is possible to obtain outputs from the two area sensors 1 and 2. This makes it possible to switch between the outputs in accordance with the switching signal while the signals corresponding to one pixel that is read out by the two area sensors 1 and 2 simultaneously in synchronism with the transfer clock are being outputted. As a result, the signals that are outputted simultaneously by the two area sensors 1 and 2 can be fed to the succeeding signal processing circuit.

Details of this selection will be described by use of the timing chart of FIG. 2. Let the output from the area sensor 1 be a sensor output $\alpha$ and the output from the area sensor 2 be a sensor output $\beta$. From the area sensors 1 and 2, as shown in (a) and (b), data are outputted in synchronism with the same transfer clock (not shown) generated from the control circuit 8.

With the sensor outputs $\alpha$ and $\beta$, the control circuit 8 switches between the switches 30 and 31 turned on by the switching signals X and Y changed over at a frequency twice the transfer clock as shown in (c) and (d). The switches 30 and 31 are ON when the switching signals X and Y are at high level and are OFF when the switching signals X and Y are at low level. Consequently, the outputs of the area sensors 1 and 2 are inputted to the variable gain amplifier 10 every high level of the switching signals X and Y, i.e. alternately.

The sensor outputs $\alpha$ and $\beta$ amplified by the variable gain amplifier 10 are sampled and held by the S/H circuit 22. (e) shows a sampling pulse generated therefor. The sampled and held signal is supplied to the clamping circuit 11.

At the clamping circuit 11, the voltage corresponding to the dark current is clamped to a predetermined voltage at a timing at which the charge of the black reference pixel is outputted. Then, the sensor outputs $\alpha$ and $\beta$ are inputted through the output selecting circuit 9 and the Vout terminal 46 to the A/D converter 32 incorporated in the microcomputer $\mu$C. (f) shows the waveform of a signal (the output of the S/H circuit 22) supplied to the A/D converter 32 at that time. (g) briefly shows the A/D converted signal.

The signal is once sampled and held by use of the sampling pulse in this process in order to remove the influence of switching noise caused by the switching between the switches 30 and 31 turned on by alternately outputting the switching signals X and Y at high level. By thus using the above-described method, data from the two area sensors 1 and 2 outputted at the same timing may be taken in and A/D converted while the area sensors 1 and 2 are being driven at the same clock.

Figure 2:
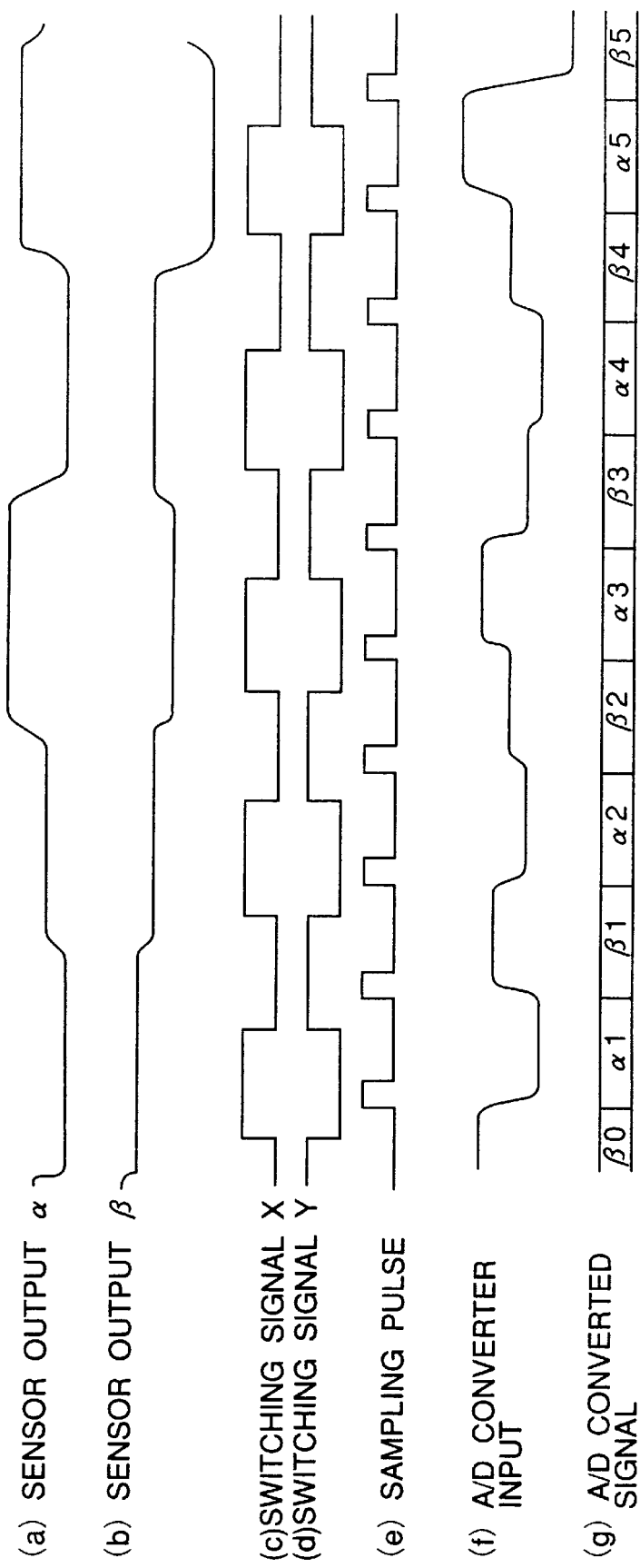
FIG. 2 is a timing chart associated with the outputs from the area sensors of FIG. 1.

The timing chart shown in FIG. 2 illustrates the case where two area sensors are used, but this chart is applicable also to cases where three or more area sensors are used. Even in such cases, processing can be performed on the same basis as when two area sensors are used. Specifically, when a number n of area sensors are used, the frequency of the switching signal is set at n times the frequency of the transfer clock that causes the area sensors to output signals. This makes it possible to feed all of the number n of signals that are simultaneously outputted by the area sensors to the signal processing circuit.

In this embodiment, the area sensors 1 and 2 of FIG. 1 are used as both image blur detecting sensors and AF sensors. When they are used as AF sensors, the outputs of the area sensors 1 and 2 are processed by the method shown in (a) to (g) of FIG. 2, and when they are used as the image blur detecting sensors, the timing of the A/D conversion is different from that of FIG. 2. Only the points of difference (changes) in the case of image blur detection will be described herein.

In the case of image blur detection, data of only one of the area sensors 1 and 2 are necessary. Therefore, when image blur detection is performed by use of the output of, for example, the area sensor 1, the A/D converter 32 is activated only at a timing at which the sensor output $\alpha$ is supplied to the A/D converter 32 and the A/D converter 32 is deactivated at a timing at which the sensor output $\beta$ is supplied. Conversely, when image blur detection is performed by use of the output of the area sensor 2, the A/D converter 32 is activated only at a timing at which the sensor output $\beta$ is supplied to the A/D converter 32 and the A/D converter 32 is deactivated at a timing at which the sensor output $\alpha$ is supplied.

Figure 3:
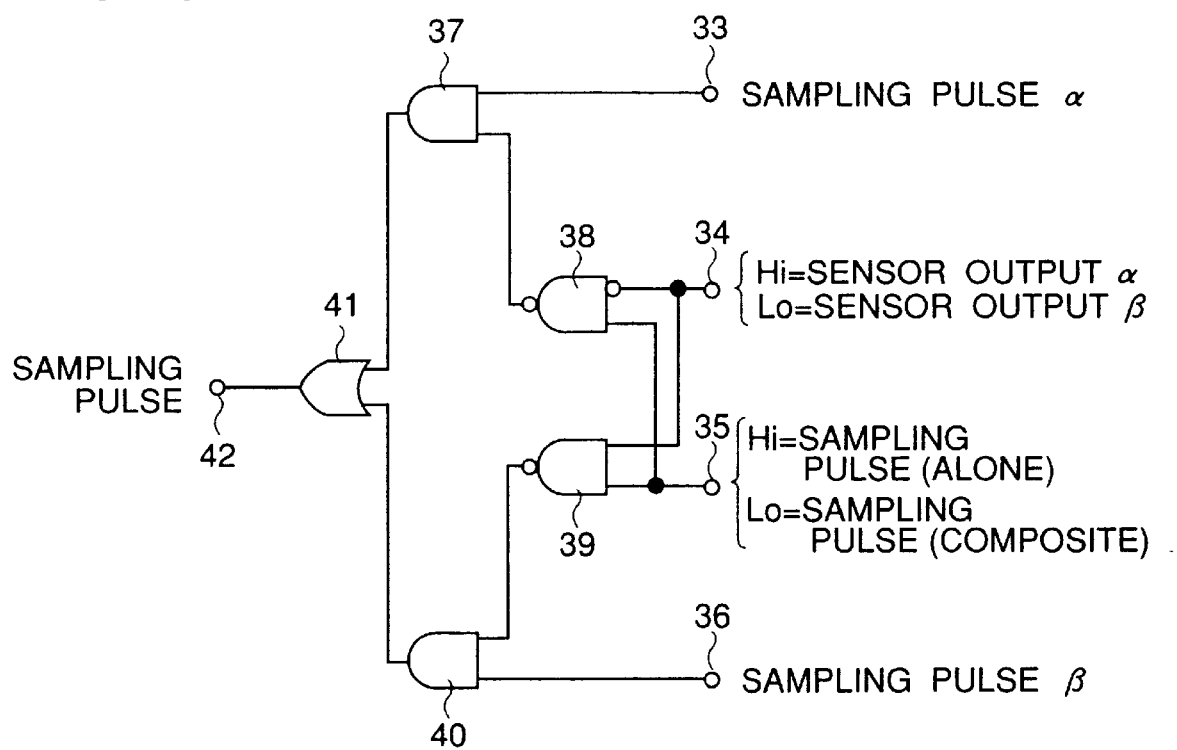
FIG. 3 shows a logic circuit for adjusting a sampling pulse.

Instead of this method, A/D conversion may be performed by use of an A/D conversion start signal synchronizing with a sampling pulse generated by a logic circuit shown in FIG. 3 so as to be switched between during automatic focusing and during image blur detection. That is, only necessary data are sampled and held and the sampled and held data are A/D converted. The logic circuit comprises, as shown in FIG. 3, input terminals 33, 34, 35 and 36, NAND circuits 38 and 39, AND circuits 37 and 40, an OR circuit 41 and an output terminal 42.

From the input terminal 33, a sampling pulse $\alpha$ is inputted and from the input terminal 36, a sampling pulse $\beta$ is inputted. The sampling pulse a and the sampling pulse $\beta$ will be described. To the S/H circuit 22, the sensor outputs $\alpha$ and $\beta$ are alternately supplied as shown in (h) of FIG. 4 by the switching signals X and Y generated from the control circuit 8.

Figure 4:
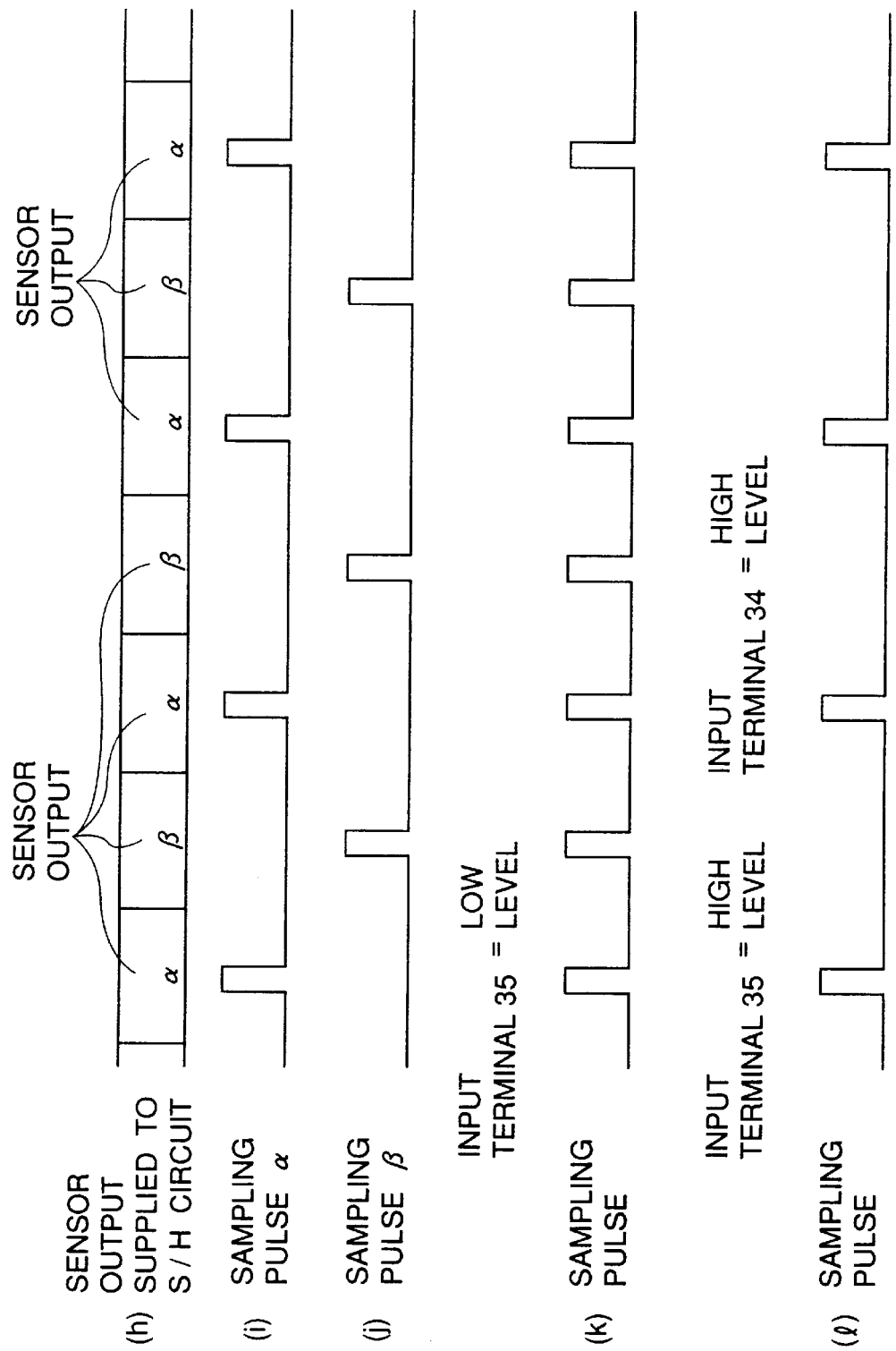
FIG. 4 shows concrete examples of sampling pulses generated from the logic circuit of FIG. 3.

The sampling pulse $\alpha$ is a pulse generated at a timing at which the sensor output $\alpha$ is supplied to the S/H circuit 22 as shown in (i) of FIG. 4. Likewise, the sampling pulse $\beta$ is a pulse generated at a timing at which the sensor output $\beta$ is supplied as shown in (j) of FIG. 4. These sampling pulses are supplied from the control circuit 8.

From the input terminal 35, a signal is supplied which specifies whether one or both of the two sensor outputs $\alpha$ and $\beta$ are sampled and held. When only one of the sensor outputs $\alpha$ and $\beta$ is used like in the case of image blur detection, i.e. when only the sampling pulse a or the sampling pulse $\beta$ alone is outputted from the output terminal 42, high level is inputted.

When both of the sensor outputs $\alpha$ and $\beta$ are used like in the case of automatic focusing, i.e. when both of the sampling pulses $\alpha$ and $\beta$ are outputted from the output terminal 42, low level is inputted. From the input terminal 34, high level is inputted when the sampling pulse $\alpha$ alone is outputted from the output terminal 42 in image blur detection, and low level is inputted when the sampling pulse $\beta$ alone is outputted from the output terminal 42 in image blur detection.

For example, when low level is inputted to the input terminal 35, irrespective of whether high level or low level is inputted to the input terminal 34, the sampling pulse outputted from the output terminal 42 is a composite pulse of the sampling pulse $\alpha$ and the sampling pulse $\beta$ as shown in (k). Consequently, the sampling pulse is similar to that shown in (e) of FIG. 2, so that both of the sensor outputs a and P are sampled and held by the S/H circuit 22.

When high level is inputted to the input terminal 35 and high level is inputted to the input terminal 34, the sampling pulse outputted from the output terminal 42 is the sampling pulse $\alpha$ alone as shown in (1), so that only the sensor output $\alpha$ is sampled and held by the S/H circuit 22.

Figure 5:
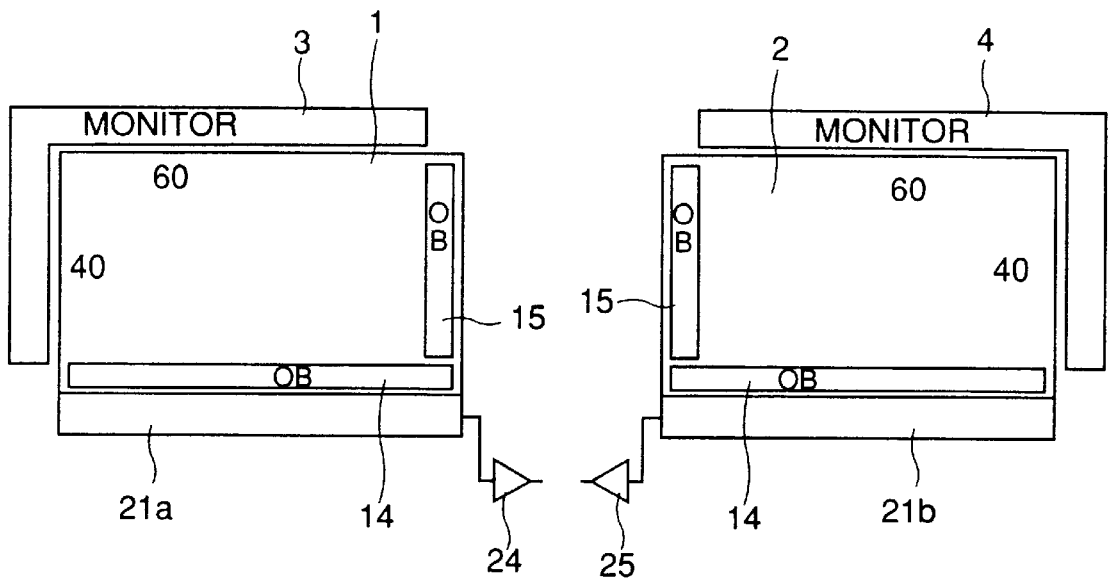
FIG. 5 shows details of positional relationship between monitors and the area sensors.
Figure 6:
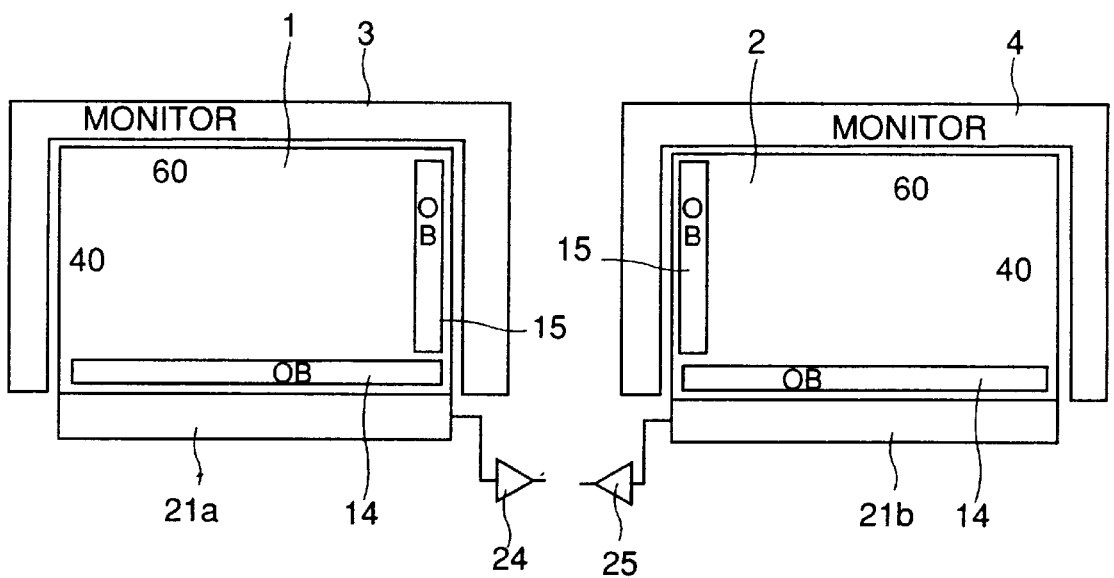
FIG. 6 shows another example of details of positional relationship between the monitors and the area sensors.

Subsequently, FIGS. 5 and 6 show details of positional relationship between the monitors 3 and 4 and the area sensors 1 and 2. In FIG. 5, the monitors 3 and 4 are disposed in an L shape on the periphery of the area sensors 1 and 2 so as to avoid the portions where the horizontal transfer registers 21a and 21b and black reference pixels 14 and 15 are present.

The portions where the horizontal transfer registers 21a and 21b and the black reference pixels 14 and 15 are present are avoided because if these portions are not avoided, the monitors 3 and 4 are away from the effective pixels of the area sensors 1 and 2 so that the positions monitored by the monitors 3 and 4 are greatly shifted from the positions actually sensed by the area sensors 1 and 2, and because if the monitors 3 and 4 are disposed not in an L shape but so as to surround the entire area sensors 1 and 2, the area of the chip increases so that the cost increases.

In FIG. 6, the monitors 3 and 4 are disposed in a U shape on the periphery of the area sensors 1 and 2 so as to avoid the portions where the horizontal transfer registers 21a and 21b are present. The reason why the portions of the black reference pixels 14 and 15 are not avoided is that since the area of the black reference pixels 14 and 15 is small compared to the area of the horizontal transfer registers 21a and 21b, the amount of shift from the portions actually sensed by the area sensors 1 and 2 is not great but is permissible and it is considered that problems are avoided which are caused when a portion of high brightness is present in the vicinity of the black reference pixels 14 and 15. The arrangement of FIG. 6 is intended for, when an image of high brightness is formed in the vicinity of the black reference pixels 14 and 15, preventing an overflow by surely monitoring the image of high brightness.

Figure 7:
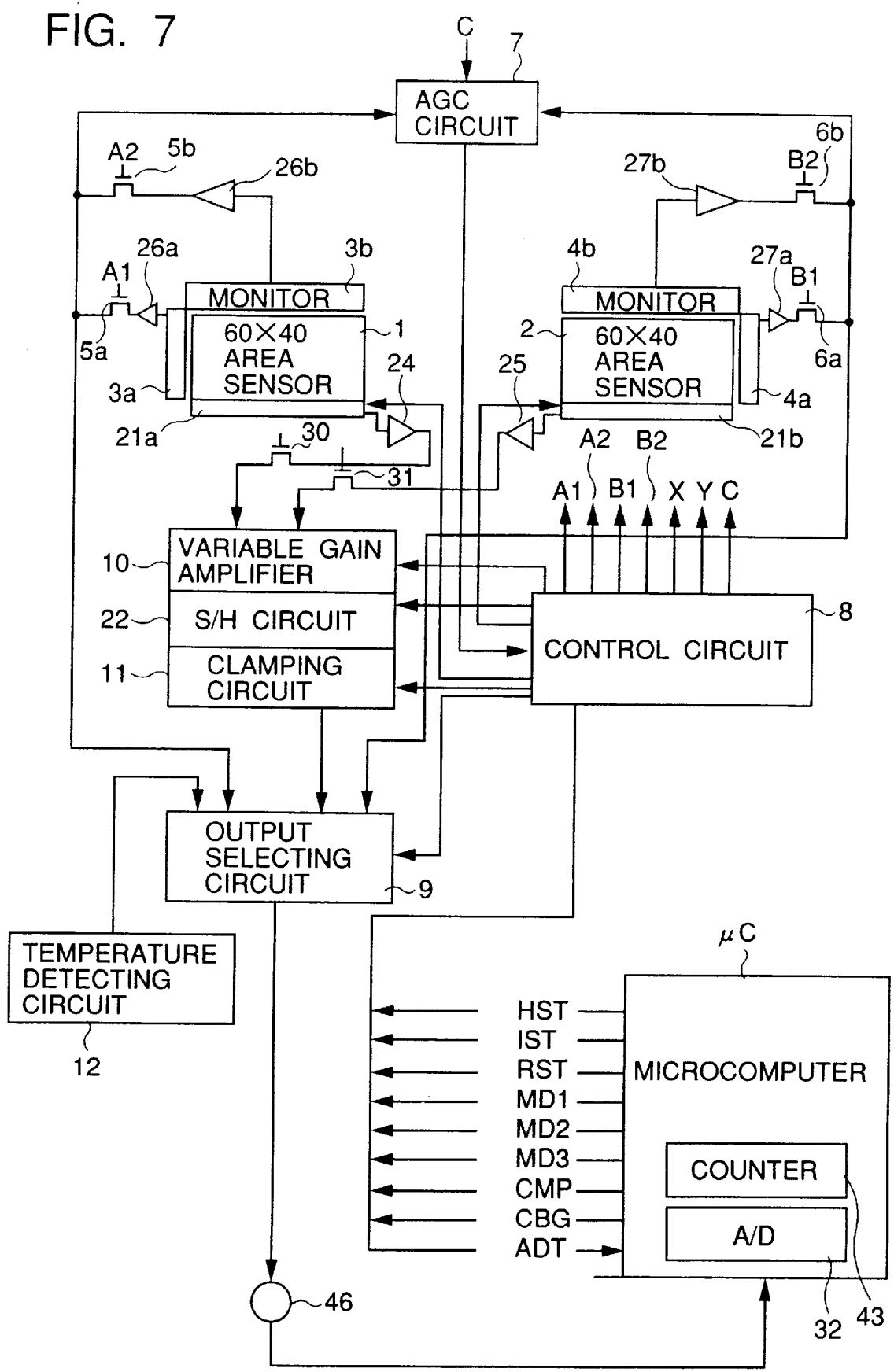
FIG. 7 shows an example, different from that of FIG. 1, of the device construction of the image detection system having the two area sensors and the control circuit for controlling the sensors.

FIG. 7 is an example, different from that of FIG. 1, of the device construction of the image detection system of a camera having two area sensors 1 and 2. The area sensors 1 and 2 of FIG. 7, like those of FIG. 1, are used as both AF sensors and image blur detecting sensors. In FIG. 7, the monitors 3 and 4 of FIG. 1 are divided into monitors 3a and 3b and monitors 4a and 4b, respectively, and the outputs of the monitors 3a, 3b, 4a and 4b are supplied through output buffers 26a, 26b, 27a and 27b and switches 5a, 5b, 6a and 6b to the AGC circuit 7 and the output selecting circuit 9. At this time, the monitor signal to be supplied to the AGC circuit 7 and the output selecting circuit 9 is selected by switching signals A1, A2, B1 and B2 outputted from the control circuit 8.

In the device of FIG. 7, the AGC circuit 7 is formed to have a plurality of predetermined voltages serving as the criterion of the determination as to whether integration is terminated naturally or forcefully, and the switching among the predetermined voltages is performed by a control signal C generated from the control signal 8. For example, in a mode where the switching signals A1 and A2 are changed to low level and the switches 5a and 5b are simultaneously turned on to simultaneously use the monitor signals of the monitors 3a and 3b, the control circuit 8 switches the predetermined voltage of the AGC circuit 7 to a high voltage with the control signal C.

On the contrary, in a mode where only one of the switches 5a and 5b is turned on to use only one of the monitor signals of the monitors 3a and 3b, the control circuit 8 switches the predetermined voltage of the AGC circuit 7 to a low voltage with the control signal C. When the switches 6a and 6b are controlled to use the monitor signals of the monitors 4a and 4b, the predetermined voltage of the AGC circuit 7 is also switched. The arrangements of the other portions are the same as those of FIG. 1.

When the image detection systems of FIGS. 1 and 7 are applied to image blur detection, since data of only one of the two area sensors 1 and 2 are necessary as mentioned above, integration control is performed by use of the monitor signal of the monitor corresponding to the area sensor being used. When the image detection systems of FIGS. 1 and 7 are applied to automatic focusing, the data of the two area sensors 1 and 2 are necessary.

Figure 8:
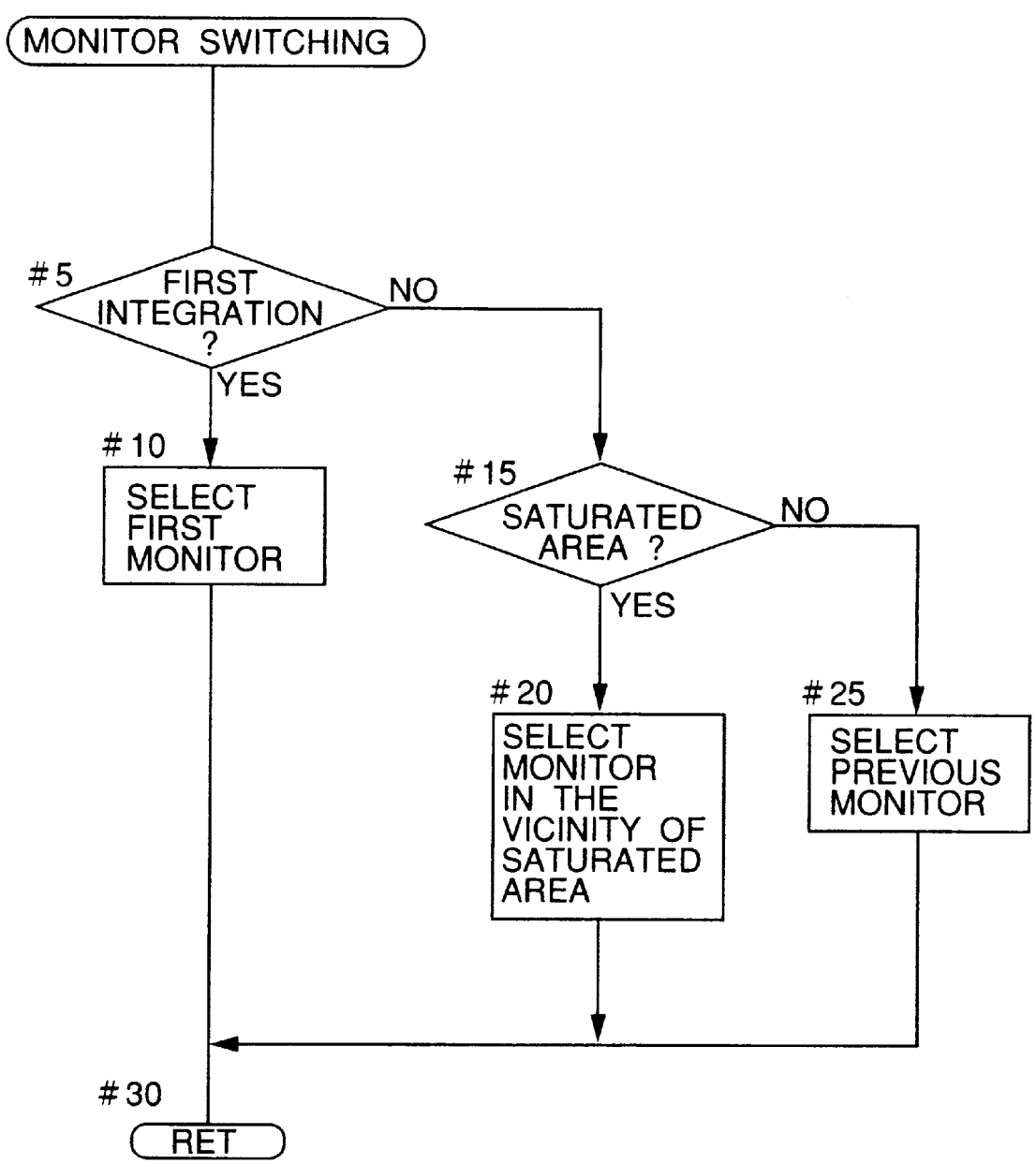
FIG. 8 is a flowchart of monitor selection in automatic focusing.

Selection of the monitor used for integration control will be described with reference to the flowchart of FIG. 8. First, whether the present integration is the first integration or not is determined at step #5. In the case of the first integration, the process proceeds to step #10 to perform integration control by use of the monitor signal of the first monitor (the monitor 3 in FIG. 1, the monitor 3a in FIG. 7).

When the present integration is not the first integration, the process proceeds to step #15 to determine whether or not there is a saturated pixel area within the effective areas of the area sensors 1 and 2 in the previous integration result. When there is a saturated pixel area, the monitor signal of the monitor in the vicinity of the saturated area is used (step #20). For example, in the image detection system of FIG. 7, it is assumed that the previous integration control is performed by use of the monitor signal of the monitor 3a.

When a saturated area is detected in the vicinity of the monitor 3b in the area sensor 1 in the previous integration result, integration control is performed by use of the monitor signal of the monitor 3b in the present integration. Alternatively, when no saturated area is detected in the area sensor 1 and a saturated area is detected in the vicinity of the monitor 4b in the area sensor 2, integration control is performed by use of the monitor signal of the monitor 4b in the present integration. On the other hand, when no saturated area is detected in the effective areas of the area sensors 1 and 2 at step #15, integration control is performed by use of the previously used monitor signal (step #25).

Figure 9:
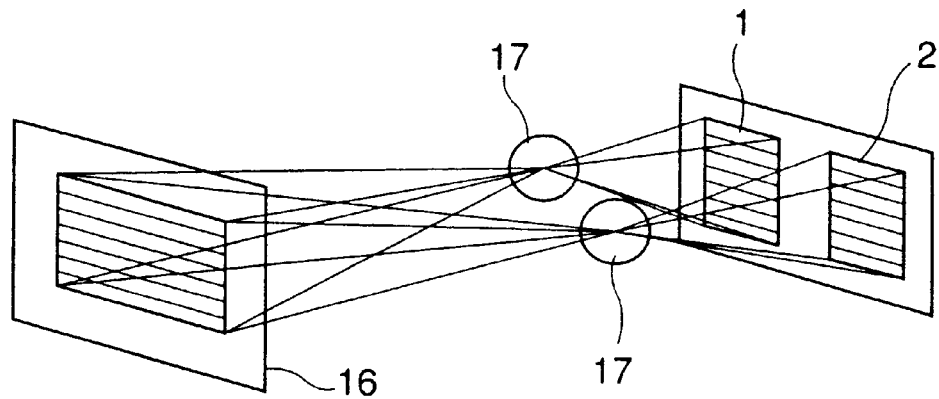
FIG. 9 is a schematic view of an optical system to which the image detection systems of FIGS. 1 and 7 are applied.
Figure 10:
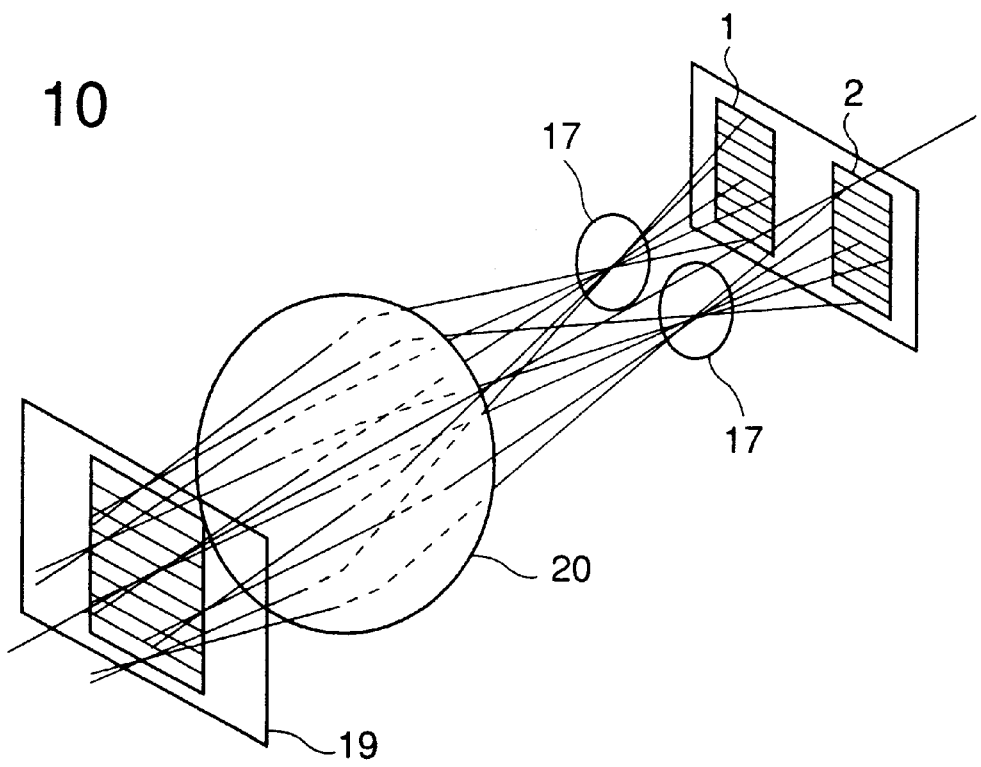
FIG. 10 is a schematic view of another optical system to which the image detection systems of FIGS. 1 and 7 are applied.

FIGS. 9 and 10 are schematic views of optical systems for a case in which the image detection systems of FIGS. 1 and 7 are applied to image blur detection and automatic focusing. FIG. 9 is a schematic view of an optical system for phase difference focus detection employing the external light passive method used for lens-shutter cameras. The optical path of subject light of a detection sensitivity area 16 in the field is split by a pair of separator lenses 17 and projected onto the pair of area sensors 1 and 2 comprising CCDs. The distance is measured based on the two split images to perform automatic focusing.

FIG. 10 is a schematic view of an optical system for phase difference focus detection employing the through-the-lens (TTL) method used for single-lens reflex cameras. The optical path of light re-imaged by a condenser lens 20 situated in the rear of a film equivalent plane 19 where photographic light of the subject is imaged is split by the pair of separator lenses 17 and projected onto the pair of area sensors 1 and 2 comprising CCDs. Defocus on the film plane is obtained based on the two split images to perform automatic focusing. When image blur detection is performed, in either of the methods, the detection is performed by using the image projected on one of the two area sensors 1 and 2.

Subsequently, an embodiment will be described in which the area sensors 1 and 2 of FIGS. 1 and 7 are employed for image blur detection. In the case of image blur detection, only a part of data of one of the area sensors 1 and 2 is necessary, and it is necessary to repeat the integration and data dump many times for a short period of time during which the shutter is opened. Therefore, this embodiment employs a method such that only the charges accumulated in necessary areas are read out at a data ratio at which A/D conversion can be performed by the A/D converter 32 incorporated in the microcomputer μC and the charges accumulated in other unnecessary areas are dumped at high speed.

An example of the simple control method will be described with reference to the timing chart of FIG. 11 and a more detailed construction view of the area sensor of FIG. 12. The timing chart shows one integration and data dump. In actuality, the operation shown by the timing chart is repetitively performed to perform image blur detection. External signals CMP, HST, MD1, MD2, MD3, IST, RST and CBG are supplied from the external microcomputer μC.

When MD1 and CBG are at low level, since integration is startable, IST is outputted at high level. In synchronism with the transition of IST to high level, ADT is outputted at high level from the control circuit 8, so that unnecessary charges accumulated in pixels are discharged. During this time, three timing pulses P1, P2 and P3 are successively generated as MD3 from the microcomputer μC to the control circuit 8 and with MD2 as the data signal, setting for various modes of the image detection systems of FIGS. 1 and 7 is made. The system of FIG. 1 will be described as a representative example herein.

The details of the setting are, sequentially, selection between the area sensors 1 and 2, selection of H/L gain (sensitivity) and selection between addition and non-addition of pixel data described later. By IST being outputted at low level after these selections are made, the control circuit 8 starts integration of the two area sensors 1 and 2 and the monitors 3 and 4. When integration is started, the monitor signal of the monitor 3 or 4 corresponding to the previously selected area sensor 1 or 2 is outputted as a Vout signal from the Vout terminal 46 through the output selecting circuit 9.

The monitor signal is also supplied from the switch 5 or 6 to the AGC circuit 7 at the same time. When the monitor signal reaches a predetermined voltage within a predetermined time, the AGC circuit 7 informs the control circuit 8 that the predetermined voltage has reached, and the control circuit 8 terminates the integration of the area sensors 1 and 2 (natural termination). At the same time, the control circuit 8 outputs ADT at low level to inform the external microcomputer μC that the integration has been terminated. After terminating the integration, the control circuit 8 generates a shift pulse inside and transfers the charges accumulated in pixels 29 of the area sensors 1 and 2 to a vertical transfer register 18 through a shift gate 13.

However, when the monitor signal of the monitor 3 or 4 does not reach the predetermined voltage of the AGC circuit 7 before the predetermined time has elapsed, i.e. when the output of ADT at low level from the control circuit 8 to the external microcomputer μC does not start before the predetermined time has elapsed, the external microcomputer μC outputs CBG at high level to thereby forcefully terminate integration. Consequently, ADT is outputted at low level.

Concurrently with the termination of the integration, the monitor signal of the monitor 3 or 4 outputted from the Vout terminal 46 is A/D converted by the A/D converter 32. Then, the amplification factor of the variable gain amplifier 10 for the sensor outputs α and β is decided in accordance with the result of the A/D conversion. The output of the monitor signal from the Vout terminal 46 is continued until the output selecting circuit 9 selects the output from the temperature detecting circuit 12.

After the termination of the integration, when an unnecessary horizontal line is present first in the selected area sensor 1 or 2, the microcomputer μC outputs HST at high level. Then, a vertical transfer clock Vcp is generated inside from the control circuit 8 to vertically transfer the charge.

At this time, with the transition of HST to high level, Cout synchronizing with internal pixel transfer clocks (vertical transfer clock Vcp and horizontal transfer clock Hcp) is outputted at high speed from the control circuit 8. That is, the vertical transfer clock Vcp is also outputted at high speed, so that the unnecessary charge of the unnecessary horizontal line is vertically transferred and discharged at high speed. In the timing chart, a state in which many pulses are continuously outputted like the Cout output is represented as squares formed by connecting both the high level and the low level by straight lines.

While the unnecessary horizontal line is being vertically transferred, the control circuit 8 outputs RCG at high level inside and opens a register clearing gate 23. Consequently, the unnecessary charge of the unnecessary pixel is discarded by being discharged into an OD 28. A counter 43 of the microcomputer μC counts the number of unnecessary horizontal lines and after the counting is finished, CMP is outputted at high level from the microcomputer μC, so that the control circuit 8 stops the vertical transfer and closes the register clearing gate 23.

Then, to set the previously decided amplification factor in the variable gain amplifier 10, the microcomputer generates a timing pulse P4 with the MD3 signal. With this, the microcomputer μC inputs IST and MD2 to the control circuit 8 as data signals and the control circuit 8 sets the gain information set by the signals IST and MD2 in the variable gain amplifier 10. In this case, the contents of IST and MD2 are the amplification factor to be set.

Then, by the microcomputer μC outputting MD1 at high level, the area sensors 1 and 2 are placed in a readout mode. Then, by the microcomputer μC generating the RST pulse, the readout of the area sensors 1 and 2 is started.

With the generation of the RST pulse, the control circuit 8 generates one vertical transfer clock Vcp to vertically transfer one line of the charge of each horizontal line, and the microcomputer μC resets the incorporated counter 43. Further, the control circuit 8 supplies the horizontal transfer clock Hcp to the horizontal transfer register 21 to horizontally transfer the charge in the horizontal transfer register 21. At this time, as described with reference to FIG. 2, the outputs from the two area sensors 1 and 2 are alternately inputted to the variable gain amplifier 10. That is, the charges of the corresponding pixels of the area sensors 1 and 2 are alternately inputted in succession.

The sensor outputs α and β are inputted to the clamping circuit 11 through the S/H circuit 22. At the clamping circuit 11, CBG is inputted at low level from the microcomputer μC at a timing at which the charge of the black reference pixel is outputted. With this, the clamping circuit 11 is activated and clamps the voltage corresponding to the dark current to a predetermined voltage.

After the charge of the black reference pixel is clamped, the sensor outputs α and β are supplied to the output selecting circuit 9, and when a selection is made by the output selecting circuit 9, the selected output is outputted from the Vout terminal 46. In the output in that case, the sensor output α and the sensor output β are alternately present every ½ the period during which the data of one pixel are outputted from the area sensors 1 and 2 (see (f) of FIG. 2).

In the case of image blur detection, since only one of the sensor outputs α and β is necessary as described previously, the A/D converter 32 performs A/D conversion at a timing at which the sensor outputs α or β is inputted to the A/D converter 32. The data of the A/D converted sensor output is used for the image blur detection.

The method of image blur detection will be described later with reference to FIG. 22. While the outputs of the area sensors 1 and 2 are alternately taken out in the above-described embodiment, only one of the outputs of the area sensors 1 and 2 may be selected at the stage of sampling and holding. In that case, only one of the sensor outputs α and β is inputted to the A/D converter 32. When only one of the outputs is sampled and held, high level is inputted to the input terminal 35 at the previously-described logic circuit of FIG. 3.

Figure 11:
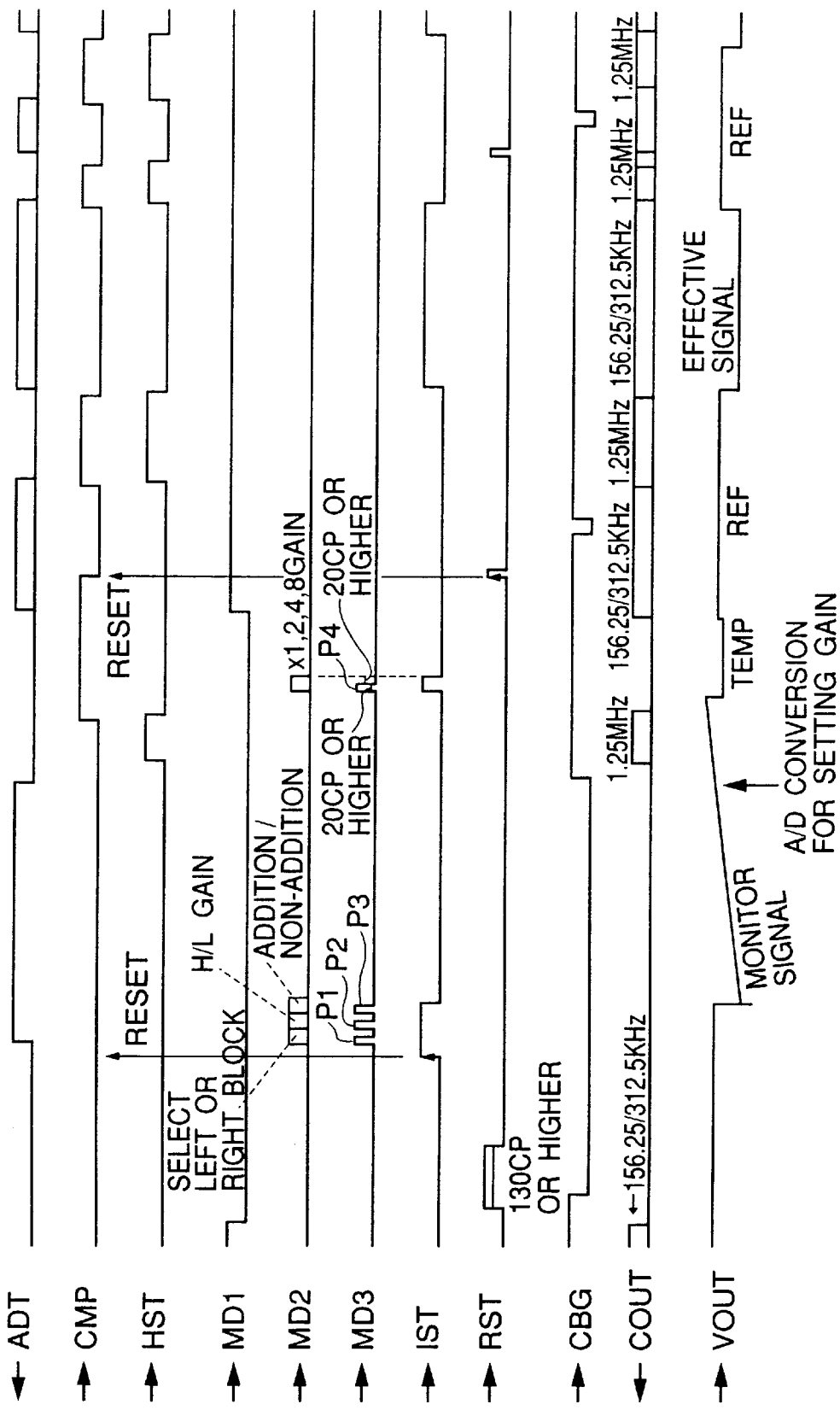
FIG. 11 is a timing chart of a control method of the image blur detection.
Figure 12:
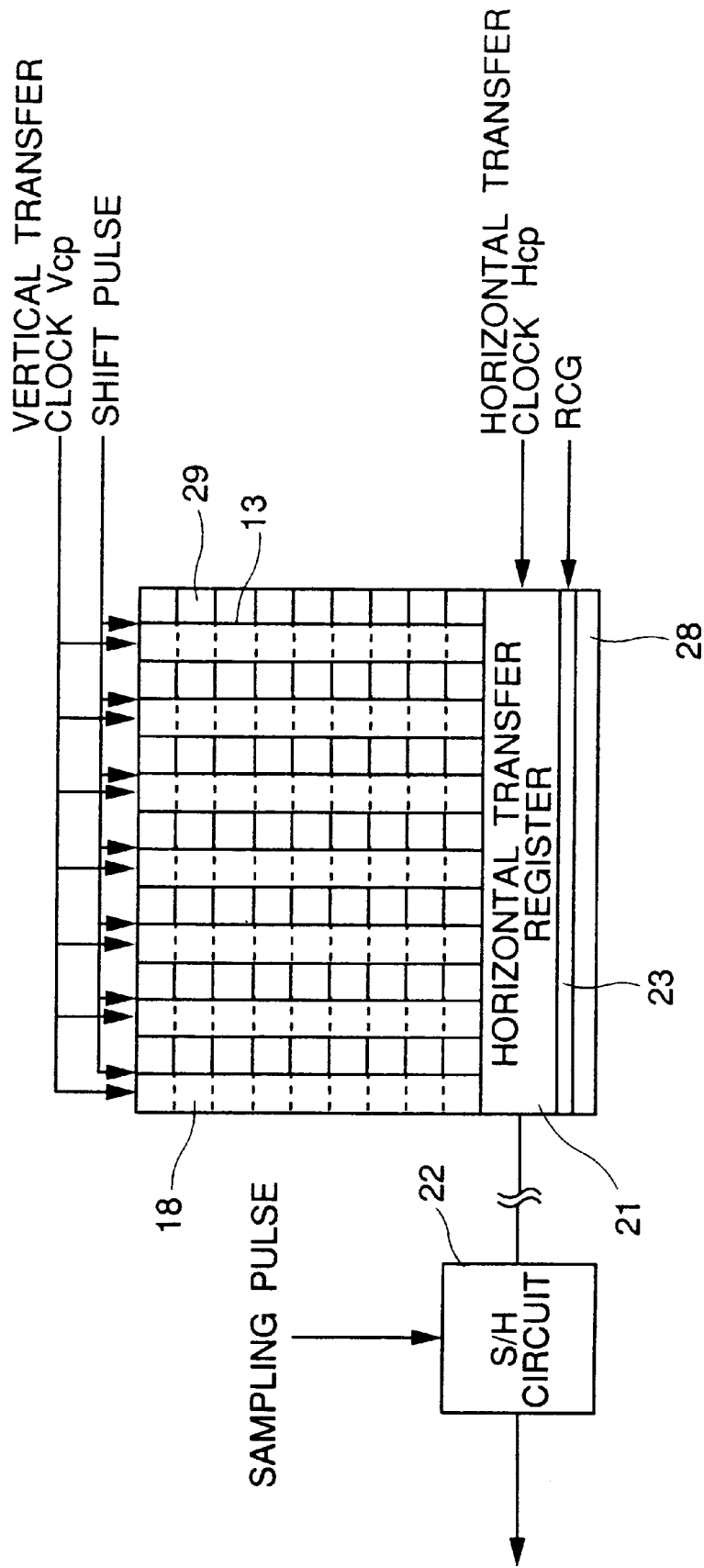
FIG. 12 is a detailed construction view of the area sensors.

Reverting to FIG. 11, after the above-described clamping is finished, the microcomputer μC changes CBG to high level. Then, when there are unnecessary pixels immediately behind the black reference pixel, the microcomputer μC sets the number of unnecessary pixels in the counter 43 shown in FIG. 1 and changes HST to high level in order to dump the charges of the unnecessary pixels at high speed.

With this, the control circuit 8 similarly generates the horizontal transfer clock Hcp at high speed, so that the charges of the unnecessary pixels are horizontally transferred and dumped at high speed. Then, the Cout clock is outputted at high speed from the Cout terminal. The charges of the unnecessary pixels are eventually discarded by not being selected by the output selecting circuit 9 (therefore, by not directed to the Vout terminal 46).

The counter 43 of the microcomputer μC counts the Cout clock corresponding to the unnecessary pixels. After the counting is finished, the microcomputer μC changes CMP to low level. After the transition of CMP to low level, the microcomputer μC changes HST to low level and then, changes IST to high level. With the transition of HST to low level, the control circuit 8 generates the horizontal transfer clock Hcp at low speed. With the transition of IST to high level, a signal of an effective pixel (effective signal) is outputted from the Vout terminal 46.

When the counter 43 of the microcomputer μC finishes the counting of the number of effective pixels, the microcomputer μC outputs CMP at high level. When there are unnecessary pixels left in the horizontal line, the microcomputer μC sets the number of unnecessary pixels in the counter 43 and changes HST to high level, so that the charges of the unnecessary pixels are horizontally transferred inside at high speed and discharged to be discarded. Further, immediately after the transition of HST to high level, the microcomputer μC changes IST to low level and the control circuit 8 controls so that instead of the unnecessary pixels, a reference voltage (REF) is outputted from the Vout terminal 46.

After the counting of the remaining unnecessary pixels is finished, the microcomputer μC outputs CMP at low level and the control circuit 8 terminates the horizontal transfer. Then, in order to read out the next horizontal line, the microcomputer μC generates the RST pulse. With this, the control circuit 8 generates one vertical transfer clock Vcp and vertically transfers one line of the charge of each horizontal line to repeat the above-described horizontal line readout operation. While the CCDs of the area sensors 1 and 2 of this embodiment employ the inter-line transfer (IT) method, it is needless to say that the frame inter-line transfer (FIT) method and the frame transfer (FT) method may be used.

Further, in this embodiment, whether pixel data are added or not is selected in setting various modes of the image detection system. Before describing the selection between addition and non-addition of pixel data, significance of the addition will be described. As described above, in the case of image blur detection, since integration and data dump are necessarily repeated many times for a short period of time, the greater the pixel area to be read out is, the more time is required, so that the response in image blur detection deteriorates. For this reason, in order to maximize the pixel area which can be read out and minimize the number of pixels to be read out, a method is employed such that the charges of adjoining pixels are added to the charges of the pixels to be read out.

Specifically, for a subject of a low frequency, since sufficient contrast cannot be obtained when the area to be detected is small, correct comparison cannot be made, so that a correct image blur amount cannot be detected. To solve this problem, it is necessary to read out a greater area. However, merely reading out a greater area increases the time required for one readout, so that sufficient image blur detection and image blur compensation cannot be made.

This problem does not arise if the speed at which the pixels are read out can be increased according to the increase in the area to be read out, i.e. according to the increase in the number of pixels to be read out. However, the pixels cannot be read out at a very high speed because of the limitation of the data ratio at which A/D conversion can be performed by the A/D converter. Therefore, in this embodiment, by adding the charges of a plurality of pixels during the transportation of the charges, the number of pixels to be read out does not change even when a greater area is read out. In addition, since the charges of a plurality of pixels are added, sufficient charges are obtained in a short period of time even in low brightness.

Figure 13A:
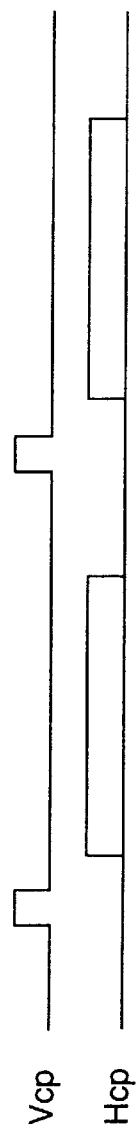
FIG. 13A is a timing chart of a case where no charges are added in the vertical direction.

Details of a driving method therefor will be described with reference to the timing charts of FIGS. 13A, 13B, 14A and 14B and the construction view of FIG. 12. FIG. 13A is a timing chart of a vertical direction non-addition mode. In this mode, one pulse of the vertical transfer clock Vcp is inputted to vertically transfer one line of charge of each horizontal line, and every time one horizontal line of charge is transferred to the horizontal transfer register 21, the horizontal transfer clock Hcp corresponding to one horizontal line of pixels is continuously inputted to horizontally transfer the charge.

Figure 13B:
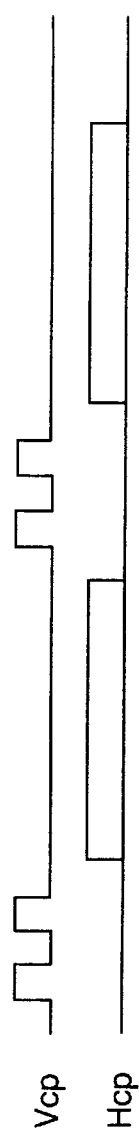
FIG. 13B is a timing chart of a case where the charges of two pixels are added in the vertical direction.

On the contrary, in a vertical direction N pixel addition mode (in this embodiment, N=2) of FIG. 13B, by inputting N pulses of the vertical transfer clock Vcp and inputting the charges in N horizontal lines to the horizontal transfer register 21, the horizontal transfer clock Hcp is inputted after the charges of N pixels adjoining in the vertical direction in the horizontal transfer register 21 are added thereto.

Figure 14A:
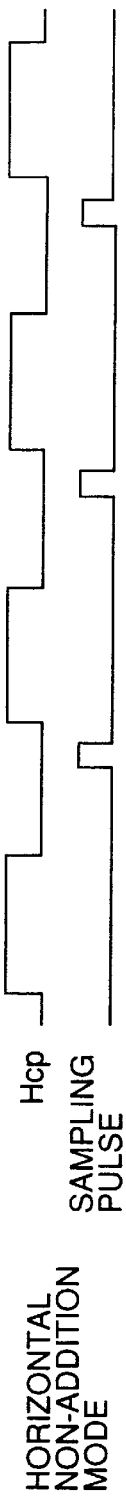
FIG. 14A is a timing chart of a case where no charges are added in the horizontal direction.
Figure 14B:
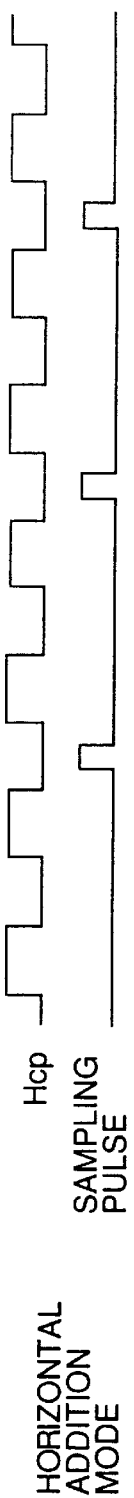
FIG. 14B is a timing chart of a case where the charges of two pixels are added in the horizontal direction.

FIG. 14A is a timing chart of a horizontal direction non-addition mode. In this mode, every time one pulse of the horizontal transfer clock Hcp is inputted, the sampling pulse is inputted to perform sampling and holding every charge in one pixel. On the contrary, in a horizontal direction N pixel addition mode (in this embodiment, N=2) of FIG. 14B, while the horizontal transfer clock Hcp is inputted at a frequency N times that of FIG. 14A, the frequency of the sampling pulse is not changed.

Figure 15:
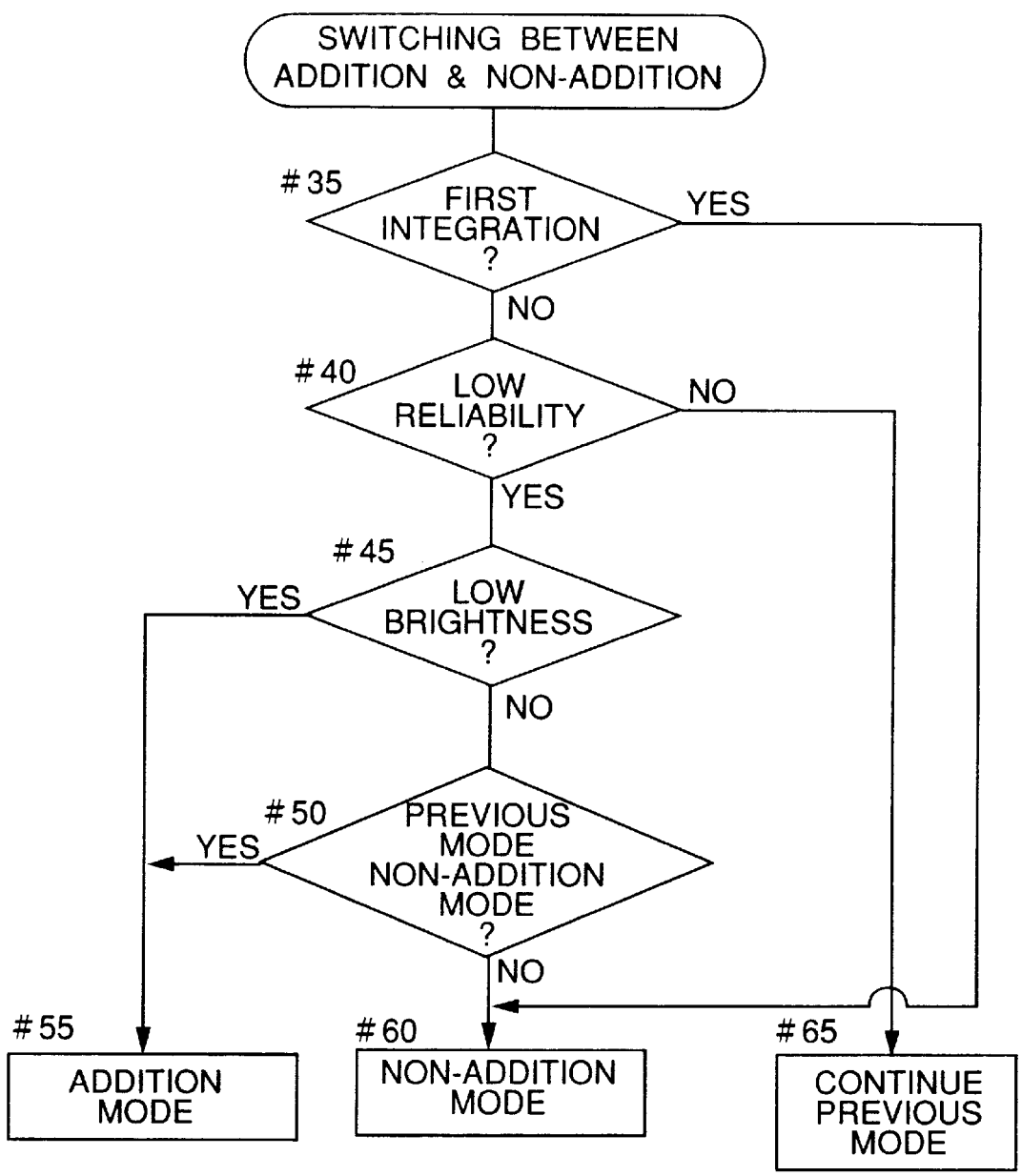
FIG. 15 is a flowchart of selection between addition and non-addition.

Since sampling and holding is performed in the S/H circuit 22 every time the charges in N pixels are inputted, the charges of N pixels in the horizontal direction are added. Consequently, although the transfer clock of the data inputted to the A/D converter 32 is the same, the data are inputted after the charges in N pixels in the horizontal direction are added thereto. The selection between addition and non-addition will be described with reference to the flowchart of FIG. 15. First, whether the present integration is the first integration or not is determined at step #35. In the case of the first integration, since whether the data is reliable or not is unknown, the process proceeds to step #60 to perform readout in the non-addition mode.

When the present integration is not the first integration, the process proceeds to step #40 and when the result of the previous detection is reliable, the process proceeds to step #65 and the previous readout mode is continued to perform integration. When the result of the previous detection is not reliable, the process proceeds to step #45 to determine whether the previous integration was performed in low brightness or not. When the integration was performed in low brightness, the process proceeds to step #55 and the present readout is performed in the addition mode.

When the previous integration was not performed in low brightness, the process proceeds to step #50, and when the previous readout mode is the addition mode, the present readout is performed in the non-addition mode (step #60) and when the previous readout mode is the non-addition mode, the present readout is performed in the addition mode (step #55). This control enables data of the present integration to be read out in the most suitable readout mode based on the previous detection result and brightness. Further, the addition mode is changed over among a mode of addition only in the vertical direction, a mode of addition only in the horizontal direction and a mode of addition in both directions according to the contrast of the subject, frequency and control sequence.

Subsequently, a case will be described in which the area sensors 1 and 2 of this embodiment will be employed for automatic focusing. When the area sensors 1 and 2 are employed for automatic focusing, of the data obtained in one integration, data are read out of specific parts of the areas of the two area sensors 1 and 2. That is, the area sensors 1 and 2 are used in a line sensor mode.

The size of one pixel of normal area sensors is only approximately a fraction of the pixel size of line sensors used for automatic focusing and the sensitivity is insufficient for a subject of low brightness. For this reason, in this embodiment, by adding the charges accumulated in several pixels of the area sensors 1 and 2 to the charges in N pixels in the vertical direction according to the timing chart of FIG. 13B, a sensitivity similar to that of line sensors is ensured.

A driving method therefor will be described with reference to the construction view of FIG. 12 and the timing chart of FIG. 16. First, the timing chart of a normal area sensor mode is shown in FIG. 16A. As the integration start operation, a shift pulse is inputted to open the shift gate 13 and the charges accumulated in the pixels 29 before integration are discharged into the vertical transfer register 18. This starts integration.

Then, by changing RCG to high level, the register clearing gate 23 given to the horizontal transfer register 21 is opened. With this, the charges transferred to the horizontal transfer register 21 are discharged into the OD 28. Then, in order to vertically transfer the charges in all the horizontal lines, the vertical transfer clock Vcp is inputted and the charges accumulated in the pixels 29 first are discharged into the OD 28 (integration clearing time). Then, RCG is changed to low level and the register clearing gate 23 is closed.

When it is sensed by use of the monitors 3 and 4 that sufficient integration is performed, the integration is naturally terminated (needless to say, there are cases where integration is forcefully terminated). Then, by inputting the shift pulse to open the shift gate 13, the charges of the pixels 29 are transferred to the vertical transfer register 18. Then, after the charges of one line of horizontal pixel train are transferred to the horizontal transfer register 21 by inputting one pulse of the vertical transfer clock Vcp, the horizontal transfer clock Hcp is continuously inputted and the horizontal transfer register 21 is driven and read out. By repeating this operation, the charges of all the pixels 29 are read out.

In contrast to the normal area sensor mode, a timing chart of a case where the mode of the area sensors 1 and 2 is changed to the line sensor mode for automatic focusing is shown in FIG. 16B. Until the termination of integration, the same operations are performed as those of the normal area sensor mode. Thereafter, to discharge the unnecessary charges of horizontal pixel trains not used as a line sensor, when the vertical transfer clock Vcp is inputted to perform vertical transfer, RCG is changed to high level simultaneously and the register clearing gate 23 is opened, and the unnecessary charges are discharged from the horizontal transfer register 21 into the OD 28.

For the horizontal pixel train used as a line sensor, with the vertical addition mode shown in FIG. 13B, RCG is changed to low level, the register clearing gate 23 is closed and by inputting the vertical transfer clock Vcp corresponding to the number of pixels necessary for forming a line sensor, the synthesis (addition) of charges of pixels is performed in the horizontal transfer register 21. Then, the horizontal transfer clock Hcp is inputted and the horizontal transfer register 21 is driven and read out as a line sensor. By thus driving, the area sensors 1 and 2 may be used as line sensors.

Moreover, in automatic focusing, the two area sensors 1 and 2 are necessarily used as a line sensor mode and data obtained from the two area sensors 1 and 2 in one integration are necessarily read out. A driving method therefor is such that, as previously described with reference to the timing chart of FIG. 2, the two sensor outputs $\alpha$ and $\beta$ are alternately supplied to the A/D converter 32 to perform A/D conversion.

When the area sensors 1 and 2 of FIGS. 1 and 7 are used as AF sensors in the line sensor mode, in this embodiment, in order that the portion used as the line sensor is not overflowed, portions in the vicinity of the monitors 3 and 4 are used where possible. Further, the area sensors 1 and 2 are also used for image blur detection.

Since the relationship with the optical axis center of the optical system is important for both the portion used for automatic focusing and the portion used for image blur detection (selected from the entire area sensor), the portion used as a line sensor in the area sensors 1 and 2 and the optical axis center of the optical system will be described by showing them in FIGS. 17A to 17D. Here, the system of FIG. 7 will be described as a representative example.

Figure 17A:
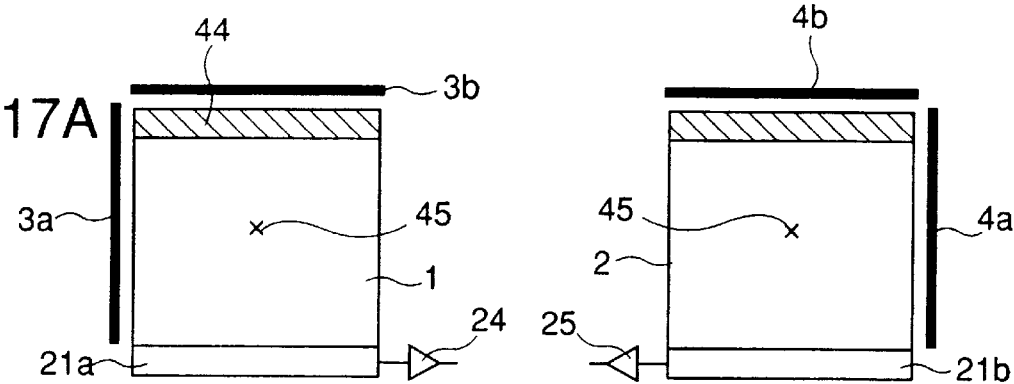
FIGS. 17A to 17D show AF areas and optical axis centers in first to fourth examples of the area sensor, respectively.

In a first example of FIG. 17A, an AF area 44 is set in the vicinity of the monitors 3*b* and 4*b* and an optical axis center 45 is set not at the center of the AF area 44 but at the center of the entire area sensors 1 and 2. Although this arrangement has a disadvantage since the center of the AF area 44 is not situated at the center of the image plane, if the detection areas of the entire area sensors 1 and 2 are not so great relative to the entire image plane, the displacement of the AF area 44 from the image plane is not so great and is permissible. Moreover, in image blur detection, the probability increases that the main subject is captured.

Figure 17B:
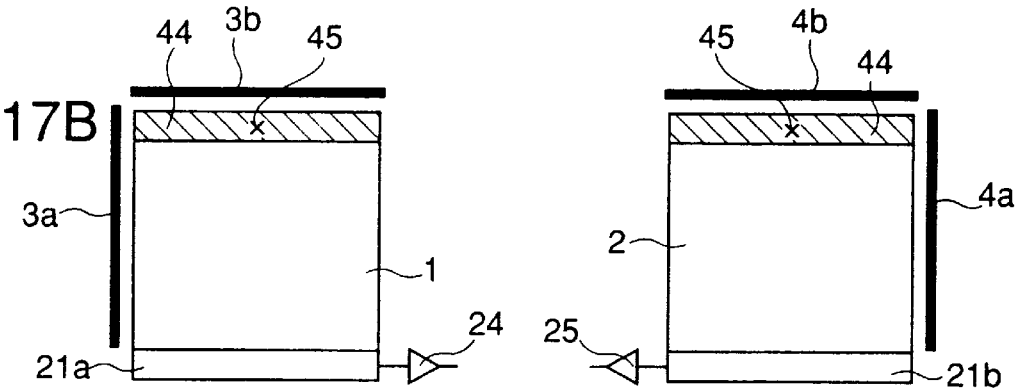

In a second example of FIG. 17B, the AF area 44 is set in the vicinity of the monitors 3b and 4b and the optical axis center of the optical system is set at the center of the AF area 44. This arrangement in which the AF area 44 is situated in the center of the image plane is the same as the arrangement of normal AF sensors. On the other hand, the image blur detection area is displaced from the center of the image plane and the probability decreases that the main subject is captured. However, this arrangement is effective since the probability is high that stationary objects in the background are captured. At this time, it is necessary to set so that the image blur detection area neither is blank nor includes only the ground.

Figure 17C:
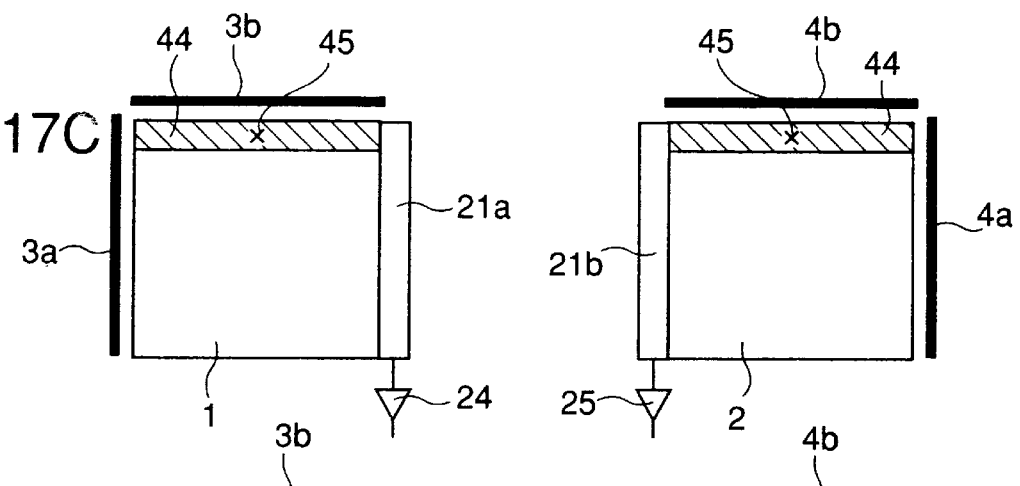

In a third example of FIG. 17C, although the pixel arrangement is the same as that of FIG. 17B, the position of the horizontal transfer registers 21a and 21b is changed for reasons of the chip layout of the IC of the area sensors 1 and 2. When the horizontal transfer registers 21a and 21b are thus arranged, the same readout method as that of FIG. 16B cannot be used. In this case, the readout is achieved by performing vertical transfer every line, performing the addition of the pixel charges in the horizontal readout and selectively storing necessary data at the time of the A/D conversion.

Figure 17D:
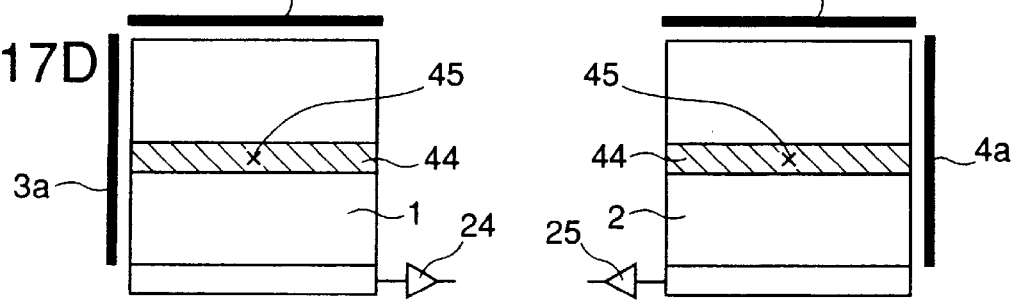

In a fourth example of FIG. 17D, with the optical axis center 45 of the optical system being situated at the center of the area sensors 1 and 2, the centers of the AF area 44 and the image blur detection area are disposed at the optical axis center 45. With this arrangement, although it does not occur that the optical axis center 45 is not included in the AF area 44 or the image blur detection area as shown in FIGS. 17A and 17B, the distance between the AF area 44 and the monitors increases, so that it is difficult to effectively perform integration control by use of the monitor signal.

Therefore, in this embodiment, although in the first integration, integration control is performed by use of a monitor voltage (monitor signal) of a monitor, in the second and succeeding integration, integration is controlled based on the previous integration time and the present monitor voltage of the previously used monitor. A concrete example of a control method therefor will be described with reference to FIG. 18. In the first integration, in the area sensors 1 and 2, integration is performed according to the above-described method until the monitor voltage reaches a predetermined voltage V1 of the AGC circuit 7, and the integration is naturally terminated (the integration time at this time is assumed to be t1).

For example, at this time, it is assumed that it is determined that correct integration control is not performed by the monitor output and the integration amount in the area sensors 1 and 2 is excessive. Since the rate of change of the integration amount of the area sensor is considered to be fixed, an optimum integration time t3 may be obtained from the time t1 and the excessive integration amount.

Figure 18:
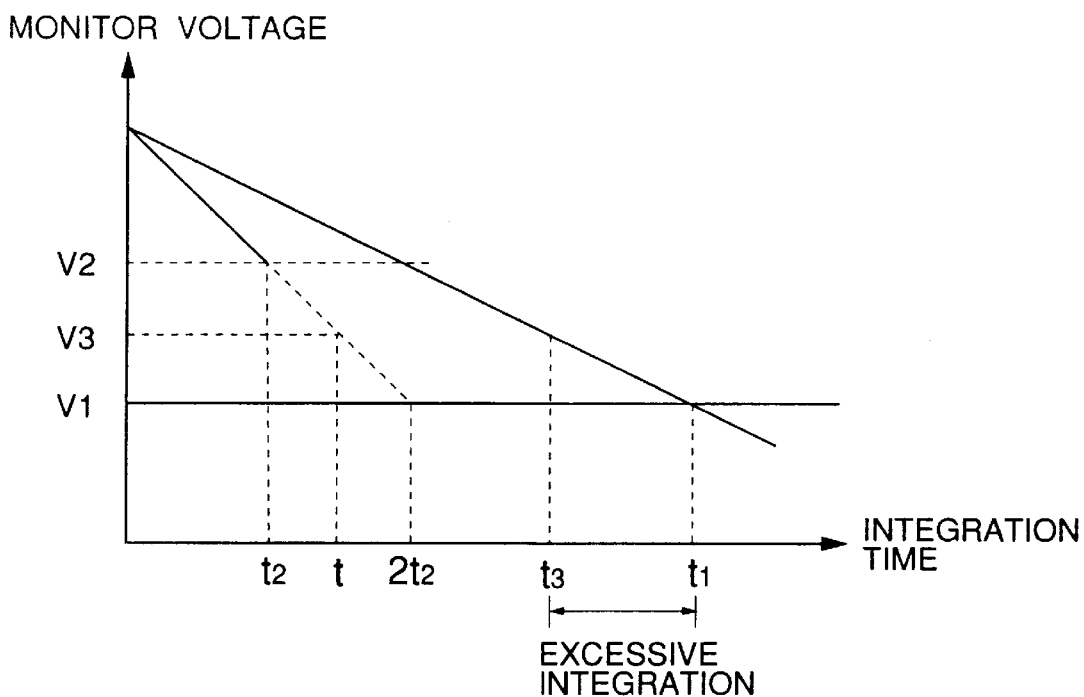
FIG. 18 shows a relationship between the integration time and a monitor voltage when the integration of the area sensors is controlled based on time.

Since the rate of change of the monitor voltage is considered to be fixed similarly to the area sensor, the relationship between the time and the monitor voltage is as shown by the straight line of FIG. 18. From this straight line, the monitor voltage at the time t3 in the first integration, i.e. an optimum monitor voltage V3 at which integration is terminated is found. In the second integration, integration is performed until a time t when the monitor voltage reaches V3. The time t is obtained from FIG. 18 by use of the following equation (equation (1)).

$$t = t3 \times (2 \times t2/t1) \quad (1)$$

Here, t2 is the time for the monitor voltage to reach a voltage V2 ½ the predetermined voltage V1 in the second integration. The time t2 is monitored by use of the AGC circuit 7. That is, the predetermined voltage V1 and the voltage V2 ½ the predetermined voltage V1 are set in the AGC circuit 7 and the time t2 for the monitor voltage to reach V2 is monitored. Then, the microcomputer $\mu C$ obtains t from the equation (1) and forcefully terminates integration at the time t. In the third and succeeding integration, with the previous integration time as t1, integration control is performed similarly to the second integration.

Figure 19:
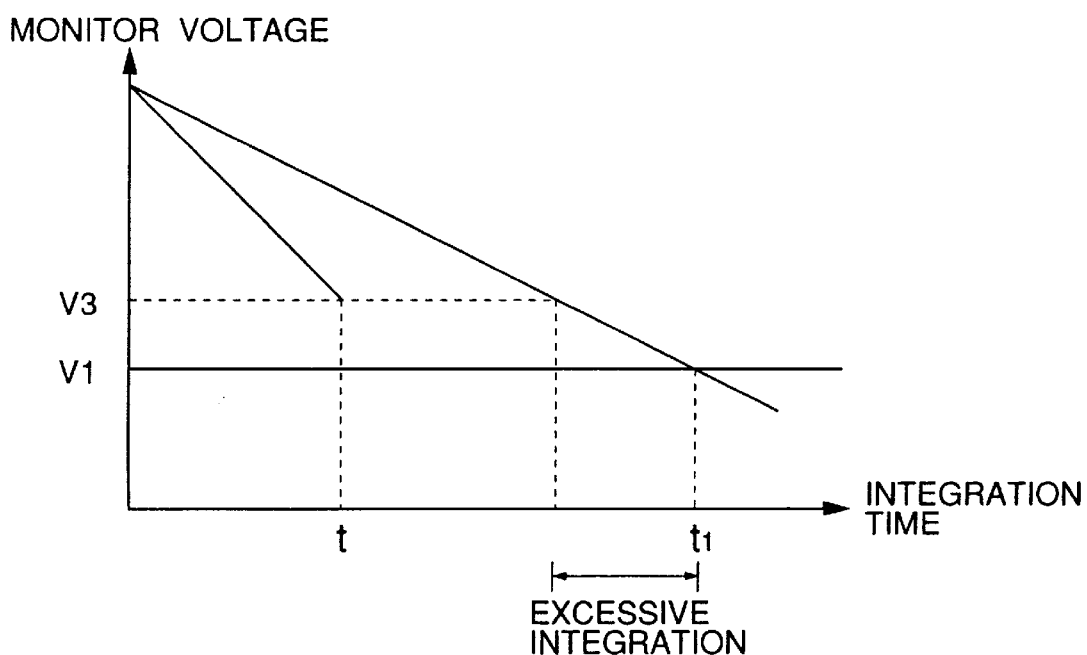
FIG. 19 shows a relationship between the integration time and the monitor voltage when the integration of the area sensors is controlled based on the monitor voltage.

FIG. 19 is an integration control method in which the method of FIG. 18 is performed with a circuit. The same operations as those of FIG. 18 are performed until the predetermined voltage V1 is set in the AGC circuit 7 to obtain the optimum monitor voltage V3. In this case, with V3 as the predetermined voltage in the termination of integration, the microcomputer $\mu C$ monitors the monitor voltage in the next integration and forcefully terminates integration when the monitor voltage reaches V3. Integration is thus controlled.

By arranging so that the natural termination voltage V3 of the monitors is inputted to the AGC circuit 7 from an external digital-to-analog (D/A) converter and externally setting the optimum monitor voltage V3 in the AGC circuit 7 as the predetermined voltage for the natural termination of integration, the second and succeeding integration may be controlled by use of the natural termination function.

Figure 20:
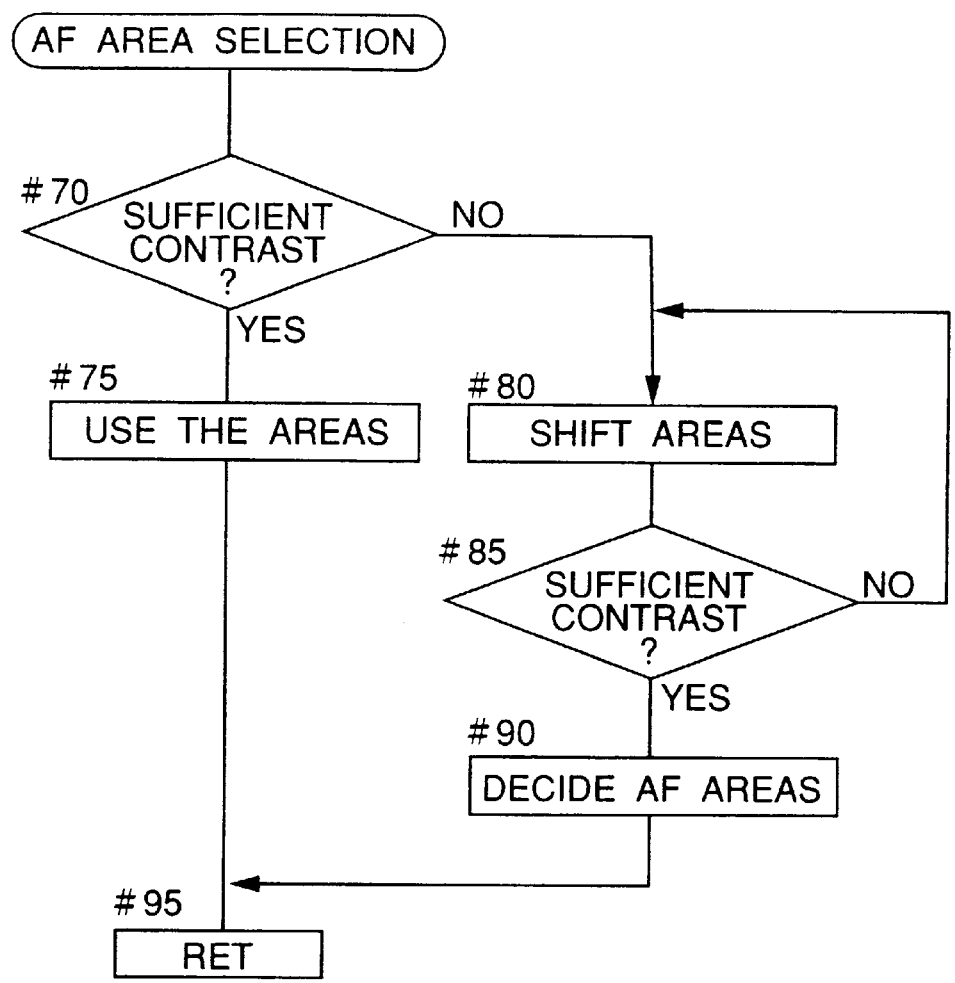
FIG. 20 is a flowchart of AF area selection.

Subsequently, AF area selection will be described with reference to the brief flowchart of FIG. 20. First, in order to prevent saturation of the area used for automatic focusing, whether areas in the vicinity of the monitors 3 and 4 are usable or not is examined at step #70. To do so, the contrast of the areas to be used for automatic focusing is obtained and it is determined whether the contrast is sufficient for performing automatic focusing or not. When it is determined that the contrast is sufficient, the process proceeds to step #75 and the areas are used.

When it is determined that the contrast is not sufficient, the process proceeds to step #80 to shift the detection areas to the next areas. Then, the process proceeds to step #85 to examine the contrast. When it is determined that the contrast is sufficient in these areas, the process proceeds to step #90 and the areas are used. When it is determined that the contrast in the areas is not sufficient, the detection areas are further shifted. Then, the process proceeds to step #85 to repeat the contrast calculation to find areas where the contrast is sufficient. Then, the process proceeds to step #90 to decide AF areas.

In the second and succeeding automatic focusing, the contrast calculation is performed in the previous detection areas. When it is determined that the contrast is low (a state in which there is no reliability) in the areas, the detection areas are shifted in the vicinity thereof and the contrast calculation is performed. Subsequently, a method for selecting an image blur detection area to perform image blur detection will be described with reference to the brief flowchart of FIG. 21 and the view of FIG. 22 showing an image detection sequence. The grid portion of FIG. 22 shows light receiving portions of the sensor.

Figure 22A:
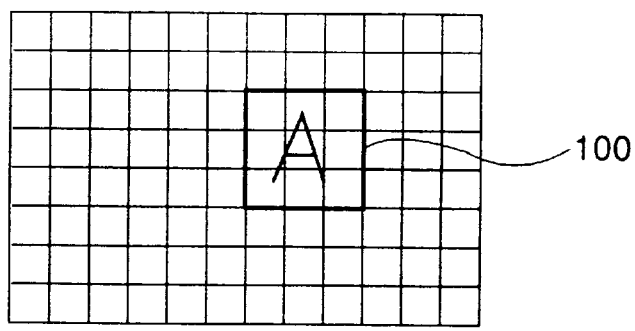
FIGS. 22A to 22D show examples of sequences obtained in the first to fourth integrations in image blur detection, respectively.
Figure 22B:
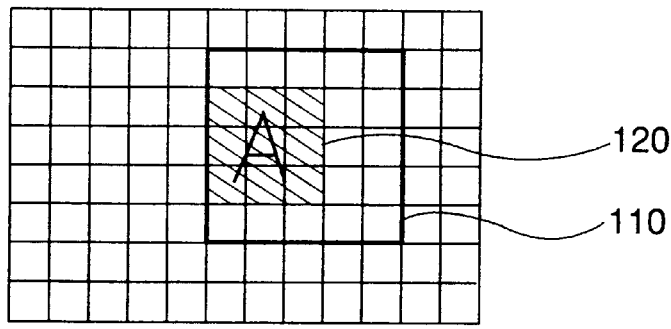

First, after automatic focusing is finished, the process proceeds to step #100 to determine whether there was a panning or not. When there was no panning, since it is considered that the main subject is present in the area for which automatic focusing has been performed, the process proceeds to step #105 to search for an area (corresponding to several pixels) in the AF area where the contrast is sufficient. When an area with sufficient contrast is found, the process proceeds to step #115 to set the area as a reference portion for image blur amount calculation. FIG. 22A shows the reference portion 100. At this time, the location of the area 100 in the area sensor 1 or 2 is determined.

To perform image blur detection, integration and data dump are further repeated thereafter while the shutter is opened. In reading out data obtained in the next integration, as an area to be read out, an area a size larger than the previously determined reference portion 100 and having its center at the center of the reference portion 100 is set as a comparison portion 110 and the data are read out. The reason why the comparison area is provided is that by limiting the area where the reference portion can be present, the probability is reduced that a shifted reference portion is erroneously recognized as another area with sufficient contrast and the data are more quickly read out than the case where the entire portion is read out since only the reference portion is necessarily read out.

Figure 22C:
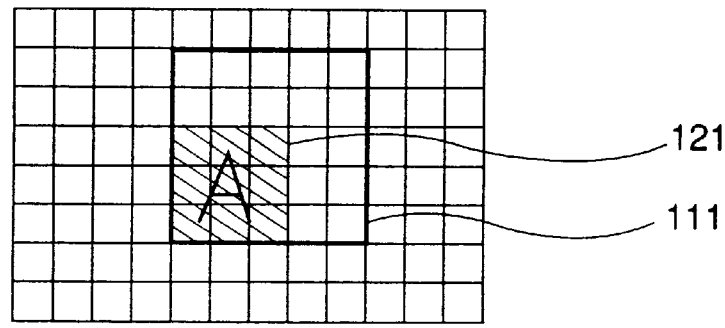

Then, an area 120 in the comparison portion 110 which is most highly correlated with the reference portion 100 is detected, the position of the area in the area sensor 1 or 2 is determined, the amount of shift from the reference portion is calculated, and image blur compensation is made with the shift amount as the image blur amount. Then, integration is further performed, and at this time, an area a size larger than the area 120 most highly correlated with the reference portion and having its center at the center of the area 120 is set as a comparison portion 111 as shown in FIG. 22C and the area is read out. Then, an area 121 in the comparison portion 111 which is most highly correlated with the area 120 is detected, the position of the area in the area sensor 1 or 2 is determined, the amount of shift from the area 120 is calculated and image blur compensation is made with the shift amount as the image blur amount.

Figure 22D:
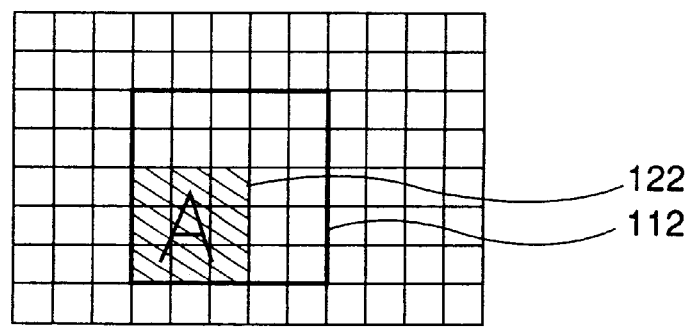

Then, integration is further performed, an area a size larger than the area 121 and having its center at the center of the area 121 as shown in FIG. 22D is set as a comparison portion 112 and the area is read out, an area 122 in the comparison portion which is most highly correlated with the area 121 is detected, the position of the area in the area sensor 1 or 2 is determined, the amount of shift from the area 121 is calculated and image blur compensation is made with the shift amount as the image blur amount. The same operation is repeated until the shutter is closed to compensate for image blur.

Figure 21:
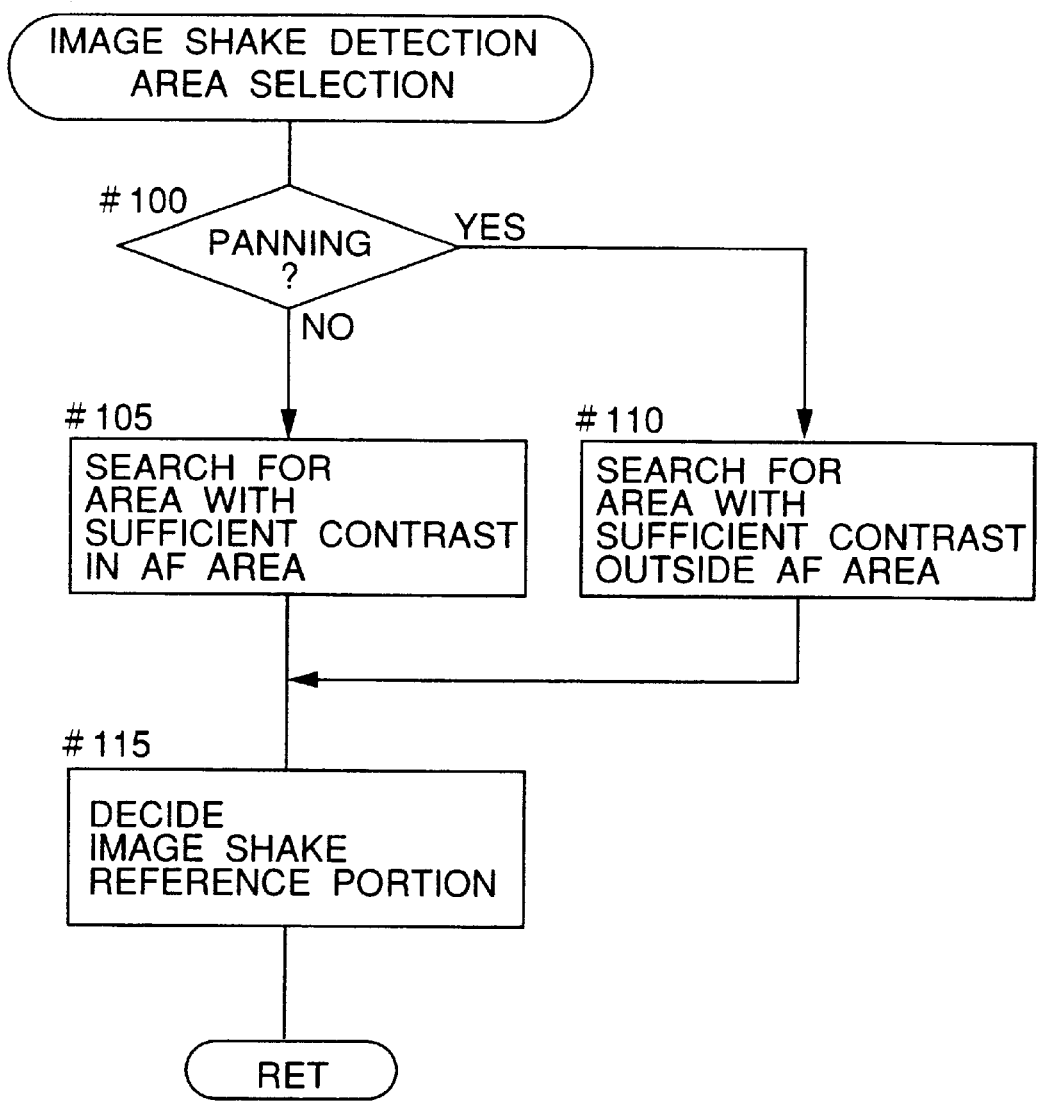
FIG. 21 is a flowchart of image blur detection area selection.

Reverting to FIG. 21, when it is determined at step #100 that there was a panning, since it is considered that the main subject is not present in the area for which automatic focusing has been performed, the process proceeds to step #110 to search for an area with sufficient contrast outside the AF area. When an area with sufficient contrast is found, the process proceeds to step #115 to perform image blur detection as described above with the area as the reference portion for image blur detection.

In this embodiment, when there was a panning, since it is considered that the main subject is outside the area, an area with sufficient contrast is searched for in the portion other than the area for which automatic focusing has been performed. Needless to say, the search for an area with sufficient contrast may be performed in succession without the area being excluded.

As a method of the panning determination, similarly to the camera shake detection, the sensor output may be obtained from a correlation between light distribution patterns with a predetermined time interval. The shift amount with respect to time of the light distribution patterns with a predetermined time interval of the sensor output used for camera shake detection is obtained, and when the shift amount is a predetermined amount or greater, it is determined that the shift is caused not by camera shake but panning and the panning amount may be sensed based on the shift amount.

As another method, an automatic focus detection operation may be used. In the automatic focus detection operation, when the defocus amount detected by the focus detection operation is a predetermined value or smaller, it is determined that the subject is stationary. When the defocus amount is another predetermined value or greater, it is determined that there was a panning and an AF lock mode is set in which the automatic focus detection operation is stopped. When the detected defocus amount is between the two predetermined values, it is determined that the subject is moving and a continuous AF mode is set. The panning determination may be made based on this operation.

Figure 23:
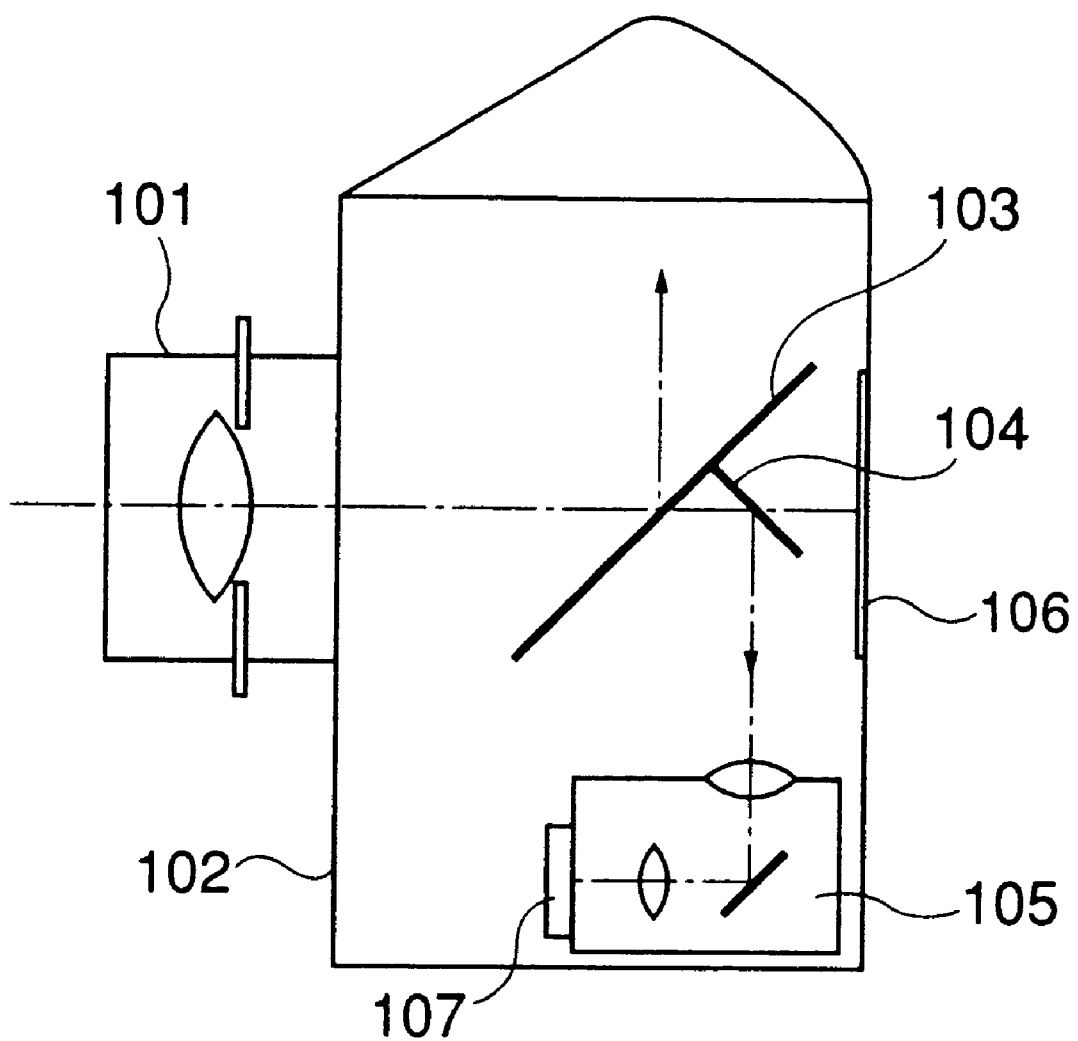
FIG. 23 is a diagram schematically showing a single-lens reflex camera as an example of an optical apparatus to which the image detection system of the invention is applied.

FIG. 23 schematically shows an example of a single-lens reflex camera to which the image detection system of the invention is applied. In FIG. 23, numeral 101 represents a taking lens, numeral 102 represents a camera body, numeral 103 represents a mirror for directing the light incoming through the taking lens 101 to a viewfinder (not shown), numeral 104 represents a mirror for directing the incoming light to an AF sensor 105, numeral 106 represents a film surface, and numeral 107 represents a unit including the sensors for the image detection system.

According to the present invention, in an image detection system having area sensors, the time required for one integration and data dump is reduced without the need for an A/D converter for high-speed videos. Consequently, without any excessive cost, integration and data dump may be repeated many times while the shutter is opened and correct image blur detection may be made.

What is claimed is:

1. An image detection system comprising:
    a number n of image sensors wherein n is greater than 1;
    a driving circuit for driving the image sensors;
    an output circuit for outputting signals from the image sensors in synchronism with a transfer clock having a predetermined frequency and supplied to each of the image sensors;
    a signal processor for processing the signals outputted from the output circuit; and
    a controller for sequentially outputting n charges in one cycle of the transfer clock, each charge is outputted from only one image sensor.

2. An image detection system as claimed in claim 1, wherein the controller includes switching devices provided in output paths of the signals from the image sensors.

3. An image detection system as claimed in claim 1, wherein the image sensors, the driving circuit, and the signal processor are formed in a single chip.

4. An image detection system as claimed in claim 1, wherein the signal processor includes a variable-gain amplifier, a sample-and-hold circuit, and a clamping circuit.

5. An image detection system as claimed in claim 4, wherein the signal processor samples and holds the signals from the image sensors with different timing from the timing with which the signals are switched.

6. An image detection system as claimed in claim 5, wherein whether an output of one image sensor is obtained or outputs of more than one image sensor are obtained is switched by changing the timing with which sampling is performed.

7. An image detection system as claimed in claim 1, wherein focus detection and image blur detection are performed based on an output of the signal processor.

8. An image detection system as claimed in claim 7, wherein outputs of two image sensors are used for focus detection, and an output of one image sensor is used for image blur detection.

9. An image detection system as claimed in claim 7, wherein the signal processor includes a sample-and-hold circuit and switches between focus detection and image blur detection by changing the timing with which sampling is performed.

10. The image detection system of claim 1, wherein said image sensors are area sensors.

11. A method for processing output signals from a number n of image sensors, wherein n is greater than 1, said method comprising the steps of:
   a transferring step for outputting signals from the image sensors in synchronism with a transfer clock having a predetermined frequency and supplied to each of the image sensors; and
   an output control step for sequentially outputting n charges in one cycle of the transfer clock, each charge is outputted from only one image sensor.

12. The method for processing output signals of claim 11, wherein said image sensors are area sensors.

13. An optical apparatus comprising:
   a number n of image sensors wherein n is greater than 1;
   a driving circuit for driving the image sensors;
   an output circuit for outputting signals from the image sensors in synchronism with a transfer clock having a predetermined frequency and supplied to each of the image sensors;
   a signal processor for processing the signals outputted from the output circuit; and
   a controller for sequentially outputting n charges in one cycle of the transfer clock, each charge is outputted from only one image sensor.

14. The optical apparatus of claim 13, wherein said image sensors are area sensors.

15. An image detection system comprising:
   at least two image sensors;
   a driving circuit for driving the at least two image sensors;
   an output circuit for outputting signals from the at least two image sensors in synchronism with a transfer clock having a predetermined frequency and supplied to each of the at least two image sensors;
   a signal processor for processing the signals outputted from the output circuit; and
   a controller for setting a switching frequency independently of the frequency of the transfer clock in order to sequentially output a charge from each of the at least two image sensors within one cycle of the transfer clock, each charge is outputted from only one image sensor.

16. The image detection system of claim 15, wherein said at least two image sensors are area sensors.

17. An image detection system comprising:
   first and second image sensors;
   a driving circuit for driving the first and second image sensors;
   an output circuit for outputting signals from the first and second image sensors in synchronism with a transfer clock having a predetermined frequency and supplied to each of the first and second image sensors;
   a signal processor for processing the signals outputted from the output circuit; and
   a controller for sequentially outputting two charges in one cycle of the transfer clock, each charge is outputted from only one image sensor.

18. The image detection system of claim 17, wherein said first and second image sensors are area sensors.

19. An image detection system comprising:
   a number n of image sensors wherein n is greater than 1;
   a driving circuit for driving the image sensors;
   an output circuit for outputting signals from the image sensors in synchronism with a transfer clock having a predetermined frequency and supplied to each of the image sensors;
   a signal processor for processing the signals outputted from the output circuit; and
   a controller for sequentially outputting n charges in one cycle of the transfer clock such that each image sensor outputs only one charge in said one cycle of the transfer clock.

20. The image detection system of claim 19, wherein said image sensors are area sensors.

21. A method for processing output signals from a number n of image sensors wherein n is greater than 1, said method comprising the steps of:
   a transferring step for outputting signals from the image sensors in synchronism with a transfer clock having a predetermined frequency and supplied to each of the image sensors; and
   an output control step for sequentially outputting n charges in one cycle of the transfer clock such that each image sensor outputs only one charge in said one cycle of the transfer clock.

22. The method for processing output signals of claim 21, wherein said image sensors are area sensors.

23. An optical apparatus comprising:
   a number n of image sensors wherein n is greater than 1;
   a driving circuit for driving the image sensors;
   an output circuit for outputting signals from the image sensors in synchronism with a transfer clock having a predetermined frequency and supplied to each of the image sensors;
   a signal processor for processing the signals outputted from the output circuit; and
   a controller for sequentially outputting n charges in one cycle of the transfer clock such that each image sensor outputs only one charge in said one cycle of the transfer clock.

24. The optical apparatus of claim 23, wherein said image sensors are area sensors.

* * * * *